United States Patent
DeWaard

(10) Patent No.: US 9,610,521 B2
(45) Date of Patent: *Apr. 4, 2017

(54) SYSTEMS AND METHODS FOR EXTRACTING PARTICULATE FROM RAW SLURRY MATERIAL

(71) Applicant: Daritech, Inc., Lynden, WA (US)

(72) Inventor: David DeWaard, Lynden, WA (US)

(73) Assignee: Daritech, Inc., Lynden, WA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/590,899

(22) Filed: Jan. 6, 2015

(65) Prior Publication Data

US 2015/0122747 A1 May 7, 2015

Related U.S. Application Data

(63) Continuation of application No. 13/351,214, filed on Jan. 16, 2012, now Pat. No. 8,926,846, and a
(Continued)

(51) Int. Cl.
| | | |
|---|---|---|
| *B01D 21/24* | (2006.01) | |
| *B65D 33/12* | (2006.01) | |
| *B65G 33/12* | (2006.01) | |

(52) U.S. Cl.
CPC ......... *B01D 21/2461* (2013.01); *B65G 33/12* (2013.01)

(58) Field of Classification Search
CPC .. B01D 21/02; B01D 21/245; B01D 21/2461; B65G 33/12; B65G 33/14;
(Continued)

(56) References Cited

U.S. PATENT DOCUMENTS

| | | |
|---|---|---|
| 683,826 A | 10/1901 | Wells |
| 832,191 A | 10/1906 | Holzer |

(Continued)

FOREIGN PATENT DOCUMENTS

| | | |
|---|---|---|
| CA | 2336838 | 6/2001 |
| CA | 2690420 | 7/2010 |

(Continued)

OTHER PUBLICATIONS

Accent Manufacturing, "TFSS 60 Sand Trap," Brochure found on Website http://www.accentmanufacturing.com/sand-separator.html, 4 pages.

(Continued)

*Primary Examiner* — Christopher Upton
(74) *Attorney, Agent, or Firm* — Michael R. Schacht; Schacht Law Office, Inc.

(57) ABSTRACT

A processing system for separating raw slurry material into particulate materials and liquid materials comprising a processing structure, a frame, and a drive motor. The processing structure defines a processing chamber, an inlet, an outlet, and at least one pre-processing opening arranged between the inlet and the outlet. The frame supports the processing structure. Operation of the drive motor rotates the processing structure such that at least some of the particulate materials in the raw slurry material are transported from the inlet to the outlet, at least some of the liquid materials in the raw slurry material are allowed to flow back towards the inlet, and at least some of the liquid materials and at least some of the particulate materials are allowed to flow through the at least one pre-processing opening.

22 Claims, 18 Drawing Sheets

Related U.S. Application Data continuation-in-part of application No. 12/917,728, filed on Nov. 2, 2010, now Pat. No. 8,470,183.

(60) Provisional application No. 61/434,803, filed on Jan. 20, 2011, provisional application No. 61/258,467, filed on Nov. 5, 2009.

(58) Field of Classification Search
CPC ...... B65G 33/18; B65G 33/24; B65G 33/365; B65G 2812/0511; B65G 33/265
USPC ..... 210/803, 523, 524, 532.1, 541; 198/657, 198/658, 662, 666, 671, 676, 677
See application file for complete search history.

(56) References Cited

U.S. PATENT DOCUMENTS

| | | |
|---|---|---|
| 992,629 A | 5/1911 | Akins |
| 1,347,724 A | 7/1920 | Ernst |
| 1,658,040 A | 2/1928 | Cohn |
| 1,993,214 A | 3/1935 | Hass |
| 2,066,479 A | 1/1937 | MacIsaac |
| 2,278,525 A | 4/1942 | Rich et al. |
| 2,630,906 A | 3/1953 | Philipp |
| 2,680,602 A | 6/1954 | Nelson et al. |
| 2,747,741 A | 5/1956 | Jacobson |
| 2,982,411 A | 5/1961 | Fontein |
| 3,007,518 A | 11/1961 | Simpson |
| 3,333,700 A | 8/1967 | Coleman |
| 3,527,668 A | 9/1970 | Kusters et al. |
| 3,606,945 A | 9/1971 | Watson et al. |
| 3,730,887 A | 5/1973 | Suzuki et al. |
| 3,736,111 A | 5/1973 | Gardner et al. |
| 3,736,120 A | 5/1973 | Tempe |
| 3,761,237 A | 9/1973 | Jeffreys |
| 3,772,144 A | 11/1973 | Carlsmith et al. |
| 3,773,659 A | 11/1973 | Carlson et al. |
| 3,865,727 A | 2/1975 | Baker et al. |
| 3,886,063 A | 5/1975 | Friesz |
| 3,971,720 A | 7/1976 | Swanson et al. |
| 3,982,499 A | 9/1976 | Frankl |
| 4,062,779 A | 12/1977 | Nakamura et al. |
| 4,097,379 A | 6/1978 | Shelstad |
| 4,121,539 A | 10/1978 | Moore |
| 4,160,724 A | 7/1979 | Laughton |
| 4,192,745 A | 3/1980 | Hood |
| 4,193,206 A | 3/1980 | Maffet |
| 4,285,816 A | 8/1981 | Lee |
| 4,303,523 A | 12/1981 | Ruppnig |
| 4,310,424 A | 1/1982 | Fremont et al. |
| 4,315,821 A | 2/1982 | Climenhage |
| 4,324,659 A | 4/1982 | Titoff |
| 4,364,831 A | 12/1982 | Burns et al. |
| 4,382,857 A | 5/1983 | Laughlin |
| 4,395,331 A | 7/1983 | Andersson |
| 4,416,764 A | 11/1983 | Gikis et al. |
| 4,460,470 A | 7/1984 | Reimann |
| 4,507,202 A | 3/1985 | Nord et al. |
| 4,608,157 A | 8/1986 | Graves |
| 4,701,266 A | 10/1987 | Janka et al. |
| 4,849,105 A | 7/1989 | Borchert |
| 4,880,530 A | 11/1989 | Frey |
| 5,022,989 A | 6/1991 | Put |
| 5,030,348 A | 7/1991 | Bengt |
| 5,041,223 A | 8/1991 | Johansson et al. |
| 5,098,572 A | 3/1992 | Faup et al. |
| 5,133,872 A | 7/1992 | Baldwin et al. |
| 5,275,728 A | 1/1994 | Koller |
| 5,290,451 A | 3/1994 | Koster et al. |
| 5,372,713 A | 12/1994 | Huber |
| 5,409,610 A | 4/1995 | Clark |
| 5,466,189 A | 11/1995 | Deutsch et al. |
| 5,472,472 A | 12/1995 | Northrop |
| 5,507,396 A | 4/1996 | Hauch |
| 5,524,796 A | 6/1996 | Hyer |
| 5,531,898 A | 7/1996 | Wickham |
| 5,587,073 A | 12/1996 | Zittel |
| 5,728,297 A | 3/1998 | Koller |
| 5,817,241 A | 10/1998 | Brayboy |
| 5,885,461 A | 3/1999 | Tetrault et al. |
| 5,894,936 A | 4/1999 | Sanders et al. |
| 5,910,243 A | 6/1999 | Bruke |
| 5,950,839 A | 9/1999 | Wedel |
| 6,039,874 A | 3/2000 | Teran et al. |
| 6,044,980 A | 4/2000 | Houle |
| 6,077,548 A | 6/2000 | Lasseur et al. |
| 6,083,386 A | 7/2000 | Lloyd |
| 6,096,201 A | 8/2000 | Bruke |
| 6,105,536 A | 8/2000 | DeWaard |
| 6,109,450 A | 8/2000 | Grunenwald et al. |
| 6,136,185 A | 10/2000 | Sheaffer |
| 6,190,566 B1 | 2/2001 | Kolber |
| 6,193,889 B1 | 2/2001 | Teran et al. |
| 6,227,379 B1 | 5/2001 | Neseth |
| 6,231,631 B1 | 5/2001 | Suzuki |
| 6,245,121 B1 | 6/2001 | Lamy et al. |
| 6,346,240 B1 | 2/2002 | Moore, Jr. |
| 6,355,167 B1 | 3/2002 | Wensauer |
| 6,375,844 B1 | 4/2002 | Ehrlich |
| 6,387,267 B1 | 5/2002 | Kantardjieff |
| 6,398,959 B1 | 6/2002 | Teran et al. |
| 6,443,094 B1 | 9/2002 | DeWaard |
| 6,470,828 B1 | 10/2002 | Townsend et al. |
| 6,663,782 B2 | 12/2003 | Morse et al. |
| 6,890,429 B2 | 5/2005 | Herring, Sr. |
| 6,908,554 B2 | 6/2005 | Jackson |
| 6,997,135 B1 | 2/2006 | DeWaard |
| 7,001,512 B1 | 2/2006 | Newsome |
| 7,005,068 B2 | 2/2006 | Hoffland |
| 7,051,962 B2 | 5/2006 | Whitsel et al. |
| 7,067,065 B2 | 6/2006 | Schloss |
| 7,255,223 B2 | 8/2007 | Schaer et al. |
| 7,258,238 B2 | 8/2007 | Raghupathy |
| 7,306,731 B1 | 12/2007 | DeWaard |
| 7,631,595 B1 | 12/2009 | DeWaard |
| 7,964,105 B2 | 6/2011 | Moss |
| 7,972,517 B1 | 7/2011 | Miller |
| 7,987,778 B1 | 8/2011 | DeWaard |
| 8,142,667 B2 | 3/2012 | DeWaard |
| 8,201,495 B2 | 6/2012 | DeWaard |
| 8,470,183 B2 | 6/2013 | DeWaard |
| 8,889,016 B2 | 11/2014 | DeWaard |
| 8,926,846 B2 | 1/2015 | DeWaard |
| 2001/0013497 A1 | 8/2001 | Kolber |
| 2002/0020677 A1 | 2/2002 | Noll |
| 2002/0079266 A1 | 6/2002 | Ainsworth et al. |
| 2002/0084227 A1 | 7/2002 | Sower |
| 2002/0086077 A1 | 7/2002 | Noller et al. |
| 2003/0057160 A1 | 3/2003 | Williams et al. |
| 2004/0074835 A1 | 4/2004 | Yoshimoto et al. |
| 2004/0154988 A1 | 8/2004 | Sheets, Sr. |
| 2004/0159608 A1 | 8/2004 | Hoffland |
| 2006/0266676 A1 | 11/2006 | Bossen |
| 2006/0273048 A1 | 12/2006 | Doyle et al. |
| 2007/0289917 A1 | 12/2007 | Mylin et al. |
| 2009/0090679 A1 | 4/2009 | DeWaard |
| 2010/0112632 A1 | 5/2010 | DeWaard |
| 2011/0036769 A1 | 2/2011 | Homma et al. |
| 2011/0100930 A1 | 5/2011 | DeWaard |
| 2011/0198268 A1 | 8/2011 | DeWaard |
| 2011/0253227 A1 | 10/2011 | DeWaard |
| 2011/0309039 A1 | 12/2011 | DeWaard |
| 2012/0000863 A9 | 1/2012 | DeWaard |
| 2012/0031856 A1 | 2/2012 | Courtemanche et al. |
| 2012/0132734 A1 | 5/2012 | DeWaard |
| 2012/0138515 A1 | 6/2012 | DeWaard |
| 2012/0247927 A1 | 10/2012 | Marchesini |
| 2014/0083957 A1 | 3/2014 | DeWaard |
| 2015/0008193 A1* | 1/2015 | DeWaard ............... B01D 33/11 210/784 |
| 2015/0083672 A1* | 3/2015 | DeWaard ........... B01D 21/2461 210/781 |
| 2016/0121339 A1* | 5/2016 | DeWaard ............... B01D 33/11 209/162 |

(56) References Cited

U.S. PATENT DOCUMENTS

FOREIGN PATENT DOCUMENTS

| | | |
|---|---|---|
| CA | 2719630 | 5/2011 |
| CA | 2732065 A1 | 8/2011 |
| CA | 2737609 | 10/2011 |
| CA | 2764679 | 7/2012 |
| CN | 201150915 Y | 11/2008 |
| DE | 4042167 | 7/1991 |
| DE | 4239083 A | 6/1993 |
| DE | 4337890 A1 | 5/1994 |
| DE | 4143376 C2 | 12/1994 |
| EP | 0126655 A2 | 11/1984 |
| EP | 0565268 A2 | 10/1993 |
| EP | 1327470 | 7/2003 |
| JP | 5626697 A | 3/1981 |
| JP | 0985122 A | 3/1997 |
| SE | 434014 B | 7/1984 |
| WO | 9507744 A1 | 3/1995 |

OTHER PUBLICATIONS

Daritech, Inc., "EYS Separator" Brochure, Jun. 2008, 2 pages.
Daritech, Inc., "EYS Separator" Brochure, May 2008, 4 pages.
Daritech, Inc., "Roller Press" Brochure, Feb. 2010, 2 pages.
Daritech, Inc., "Roller Press" Brochure, Sep. 2008, 1 page.
McLanahan Agricultural Systems, "Sand Solutions" Brochure, 8 pages.
Parkson Corporation, "Parkson Sand Saver," found on Website http://www.henkhuizenga.com/parsonsandseparator.htm, 27 pages.
USPTO, Non-Final Office Action U.S. Appl. No. 13/926,640, Jan. 13, 2014, 8 pages.
Schacht Law Office, Response to U.S. Appl. No. 13/926,640 Office Action dated Jan. 13, 2014 , Apr. 14, 2014, 10 pages.
USPTO, Non-Final Office Action U.S. Appl. No. 12/917,728, Sep. 28, 2012, 8 pages.
USPTO, Notice of Allowance U.S. Appl. No. 12/917,728, Mar. 4, 2013, 5 pages.
USPTO, Non-Final Office Action U.S. Appl. No. 14/542,951, Jun. 8, 2016, 46 pages.

* cited by examiner

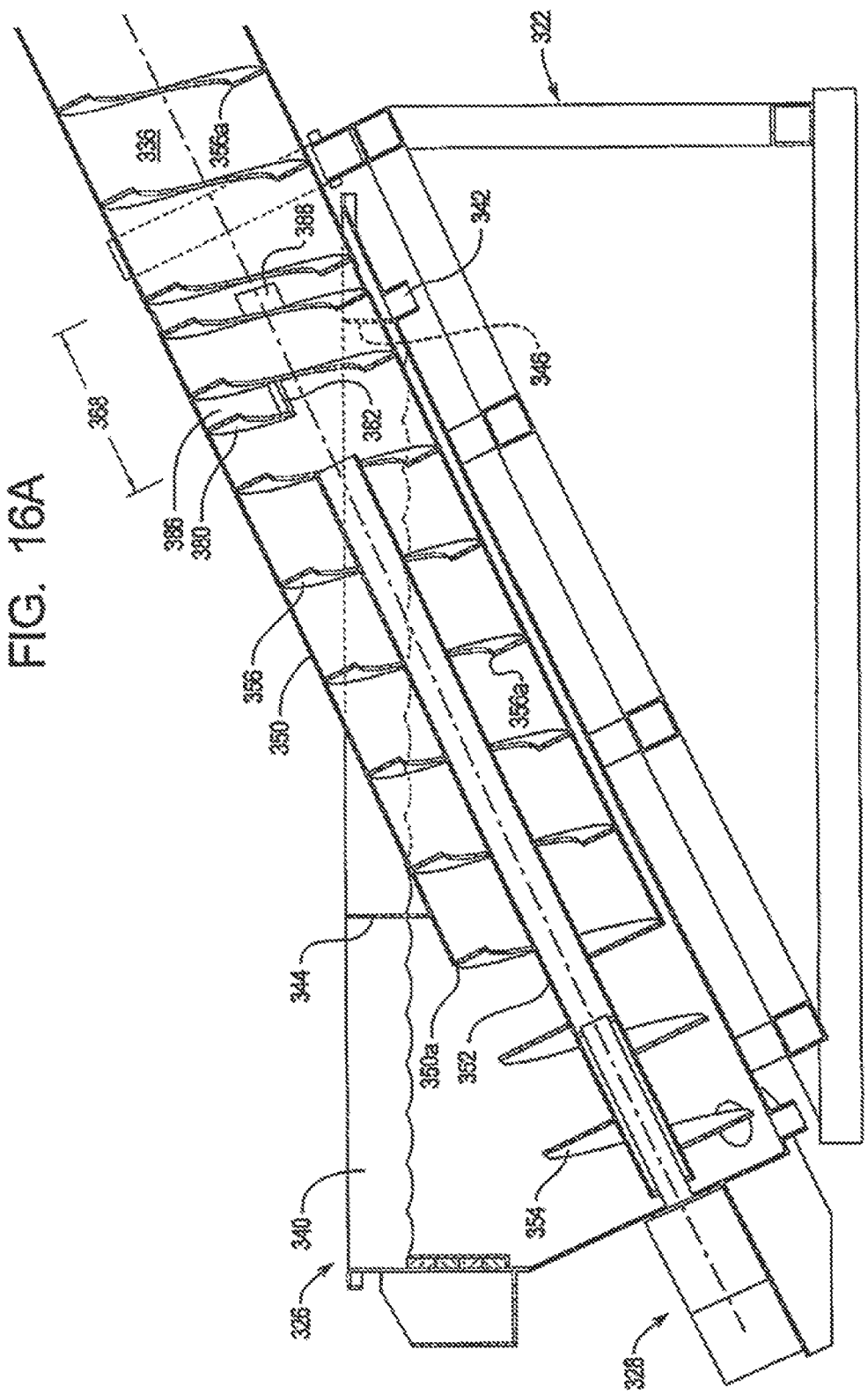

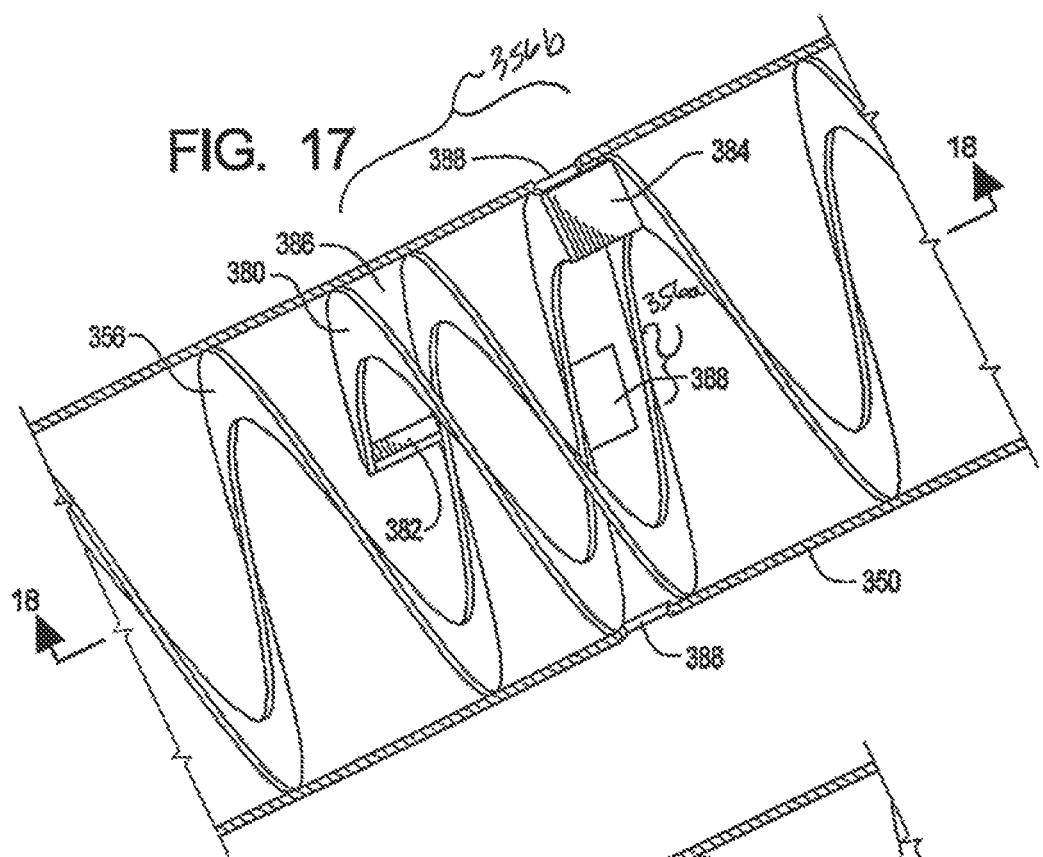
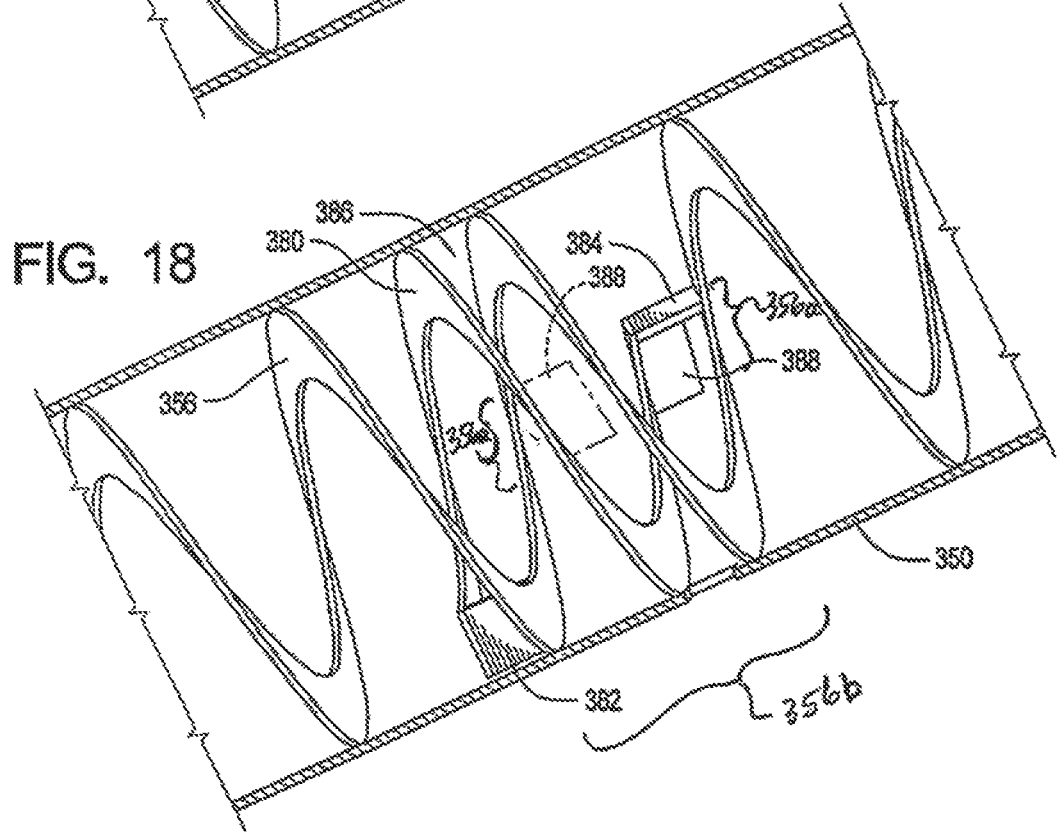

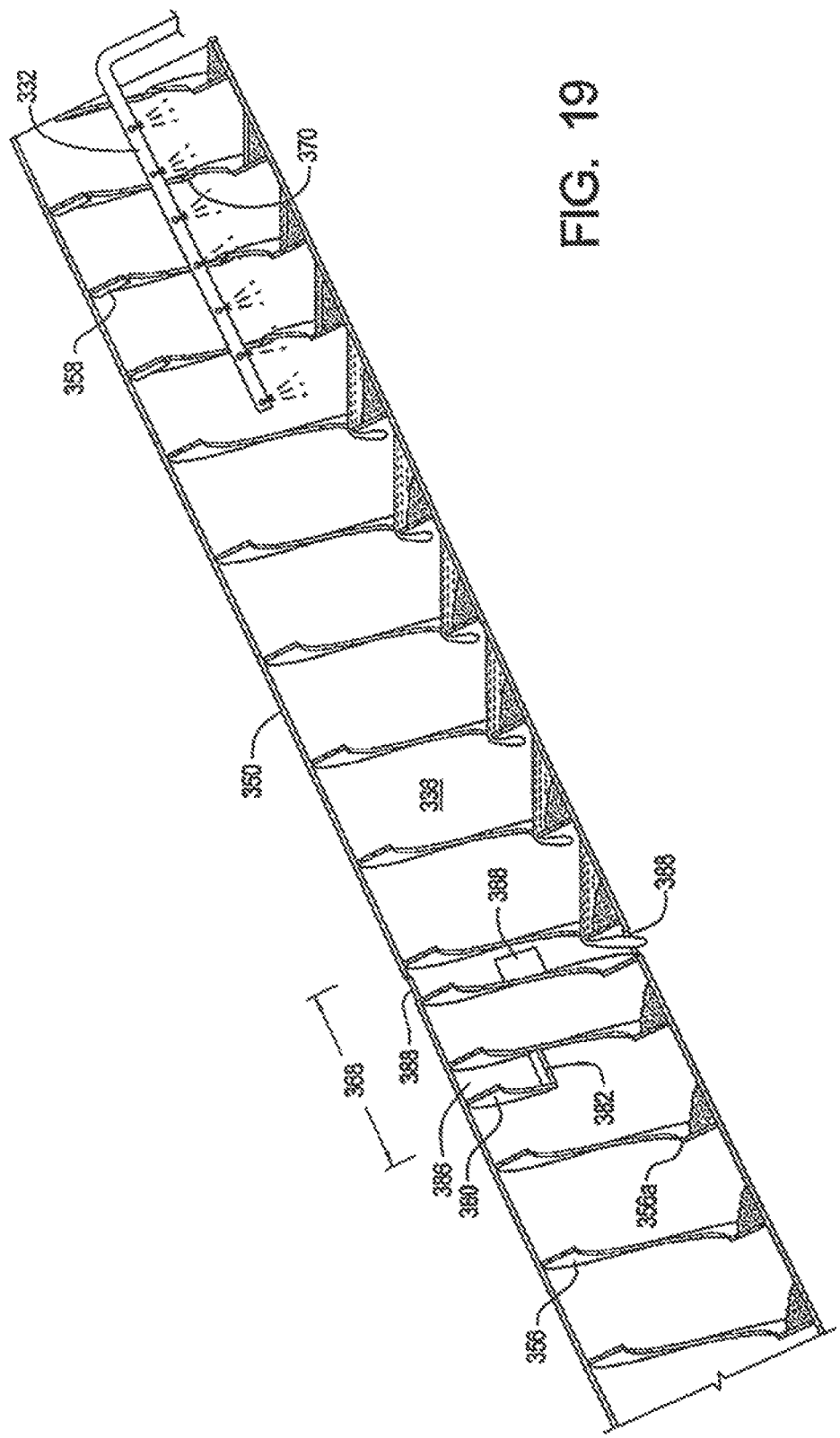

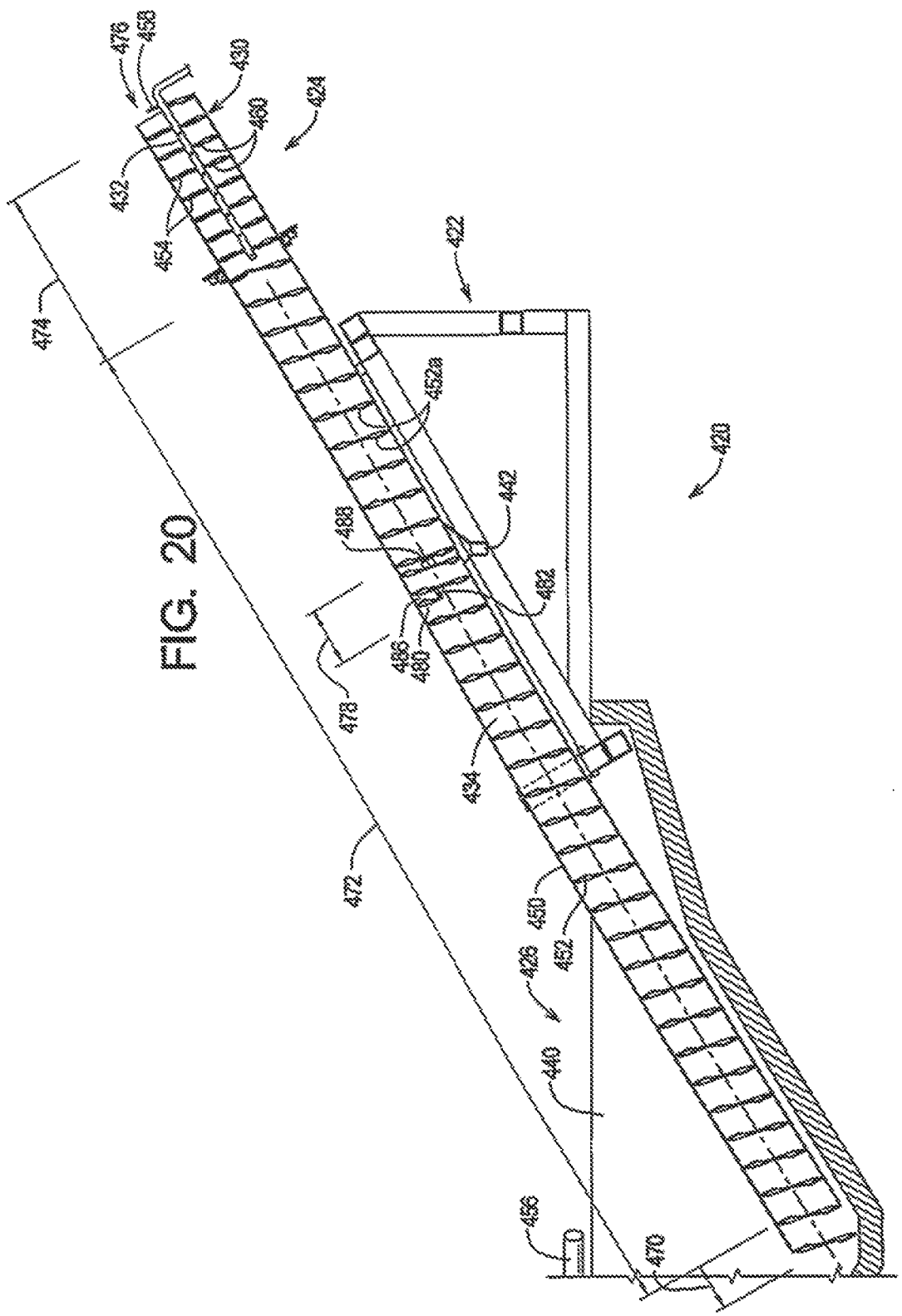

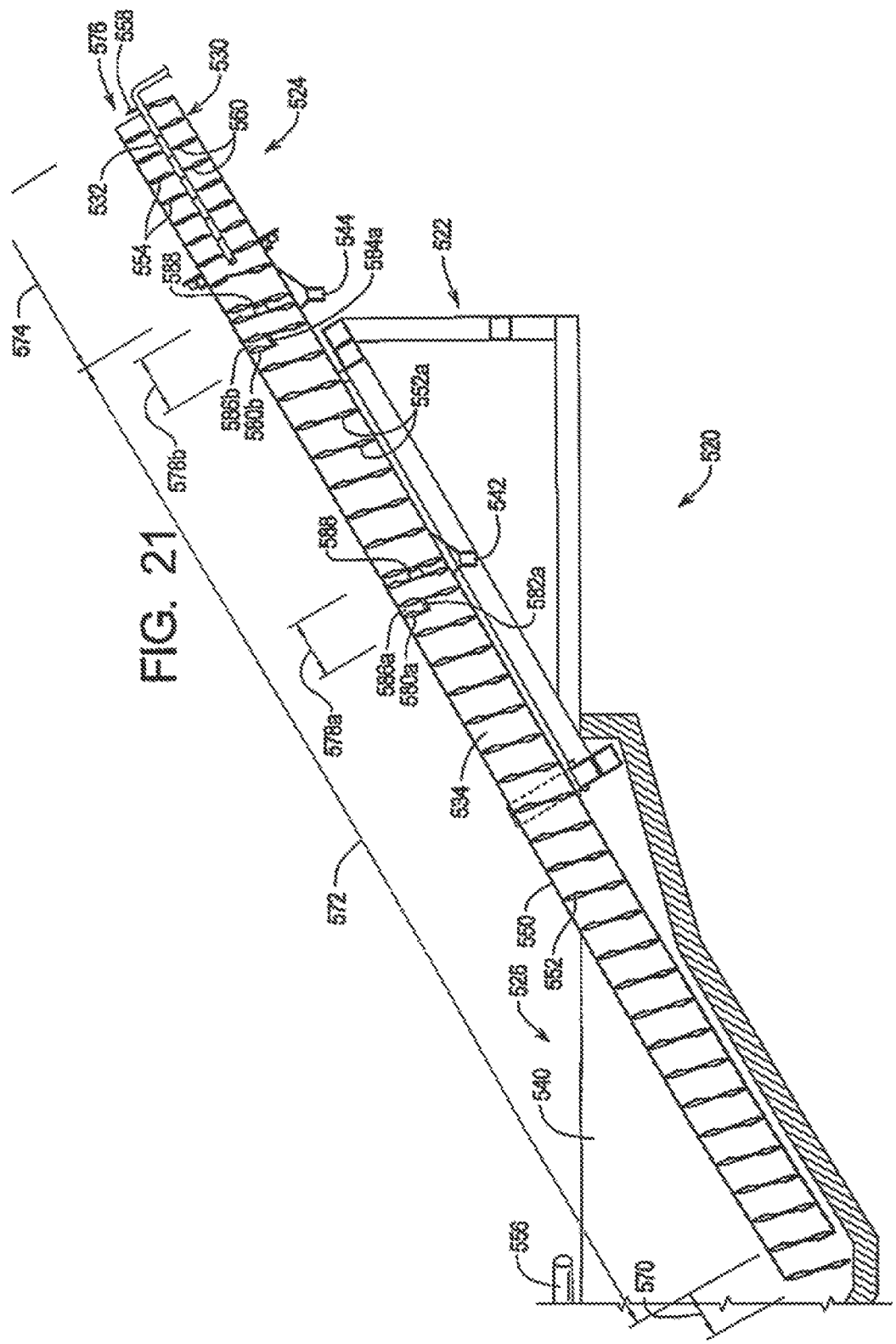

SYSTEMS AND METHODS FOR EXTRACTING PARTICULATE FROM RAW SLURRY MATERIAL

RELATED APPLICATIONS

This application U.S. patent application Ser. No. 14/590,899 filed Jan. 6, 2015 is a continuation of U.S. patent application Ser. No. 13/351,214 filed Jan. 16, 2012, now U.S. Pat. No. 8,926,846 which issued on Jan. 6, 2015.

U.S. application Ser. No. 13/351,214, claims benefit of U.S. Provisional Patent Application Ser. No. 61/434,803 filed Jan. 20, 2011.

U.S. application Ser. No. 13/351,214 is also a continuation-in-part of U.S. patent application Ser. No. 12/917,728 filed Nov. 2, 2010 now U.S. Pat. No. 8,470,183 which issued on Jun. 25, 2013.

U.S. patent application Ser. No. 12/917,728 claims priority to U.S. Provisional Application Ser. No. 61/258,467, filed Nov. 5, 2009.

The contents of all related applications listed above are incorporated herein by reference.

TECHNICAL FIELD

The present invention relates to the extraction of solid particulates from raw slurry material and, in particular, to the extraction of solid particulates such as sand from raw slurry material comprising at least water, animal or human waste, and solid particulates.

BACKGROUND

In many situations, it is desirable to separate a slurry of raw material into constituent solid and liquid components. For example, while the general composition of municipal waste may be known, any particular gallon of municipal waste may contain a variety of unknown solid or liquid components. Any one of these unknown components may represent an environmental hazard. Accordingly, before municipal waste can be introduced into the environment, it is typically processed to remove any hazardous components. Municipal waste is thus typically processed in a variety of stages designed to remove liquid and solid materials that might be unsuitable for discharge into the environment.

Modern animal husbandry operations such as dairy farms represent another example of a system requiring the processing of a slurry of raw material to remove solid particulates. The present invention is of particular significance in the context of processing waste from a dairy farm, and that application of the present invention will be described in detail herein. However, the principles of the present invention may be applied to any system in which a slurry of raw material must be processed to remove solid components from the slurry.

Dairy farms often require the handling of relatively large numbers of animals in indoor facilities. For example, cows in a dairy operation are kept at least part of the day in stalls defining a stall resting surface. From a cow's perspective, the stall resting surface should be covered with bedding material that is comfortable to lie on, provide uniform support, be cool in the summer, be non-abrasive, and provide confident footing during reclining and rising maneuvers. From the perspective of the operator of the dairy, bedding material should not be detrimental to the health of the cows or the quality of the milk produced by the cows. Sand has been proven to be advantageous as a bedding material and is commonly used in modern dairy operations.

When used as a bedding material, sand often becomes mixed with manure and possibly other contaminants. When cleaning systems are used to remove manure from a diary facility, raw slurry material is formed containing rinse liquids, liquid manure, solids, sand, and possibly other contaminants. If possible, it is desirable to convert components of the raw slurry mixture to usable materials and/or reuse the components of the raw slurry mixture. It is also desirable to allow the sand to be reused.

The present invention relates to the removal of particulate material such as sand from raw slurry mixtures so that the sand may be reused. Removal of sand from the raw slurry material further forms a processed slurry (low sand content) that is more appropriate for further processing operations such as extraction of water, composting, and/or digesting.

SUMMARY

The present invention may be embodied as a processing system for separating raw slurry material into particulate materials and liquid materials comprising a processing structure, a frame, and a drive motor. The processing structure defines a processing chamber, an inlet, an outlet, and at least one pre-processing opening arranged between the inlet and the outlet. The frame supports the processing structure. Operation of the drive motor rotates the processing structure such that at least some of the particulate materials in the raw slurry material are transported from the inlet to the outlet, at least some of the liquid materials in the raw slurry material are allowed to flow back towards the inlet, and at least some of the liquid materials and at least some of the particulate materials are allowed to flow through the at least one pre-processing opening.

The present invention may also be embodied as a method of separating raw slurry material into particulate materials and liquid materials comprising the following steps. A processing chamber having an inlet and an outlet is defined. At least one pre-processing opening is arranged between the inlet and the outlet. The processing chamber is rotated such that at least some of the particulate materials in the raw slurry material are transported from the inlet to the outlet, at least some of the liquid materials in the raw slurry material are allowed to flow back towards the inlet, and at least some of the liquid materials and at least some of the particulate materials are allowed to flow through the at least one pre-processing opening.

BRIEF DESCRIPTION OF THE DRAWINGS

FIG. 16A is an enlarged portion of the third example particulate separator system depicted in FIG. 16;

FIGS. 17 and 18 are section views of a portion of a processing structure of the third example particulate separator system;

FIG. 19 is a side elevation section view depicting the processing of a raw slurry using the third example particulate separator system;

FIG. 20 is a side elevation section view of a fourth example particulate separator system; and FIG. 21 is a side elevation section view of a fifth example particulate separator system.

DETAILED DESCRIPTION

Figure 1:
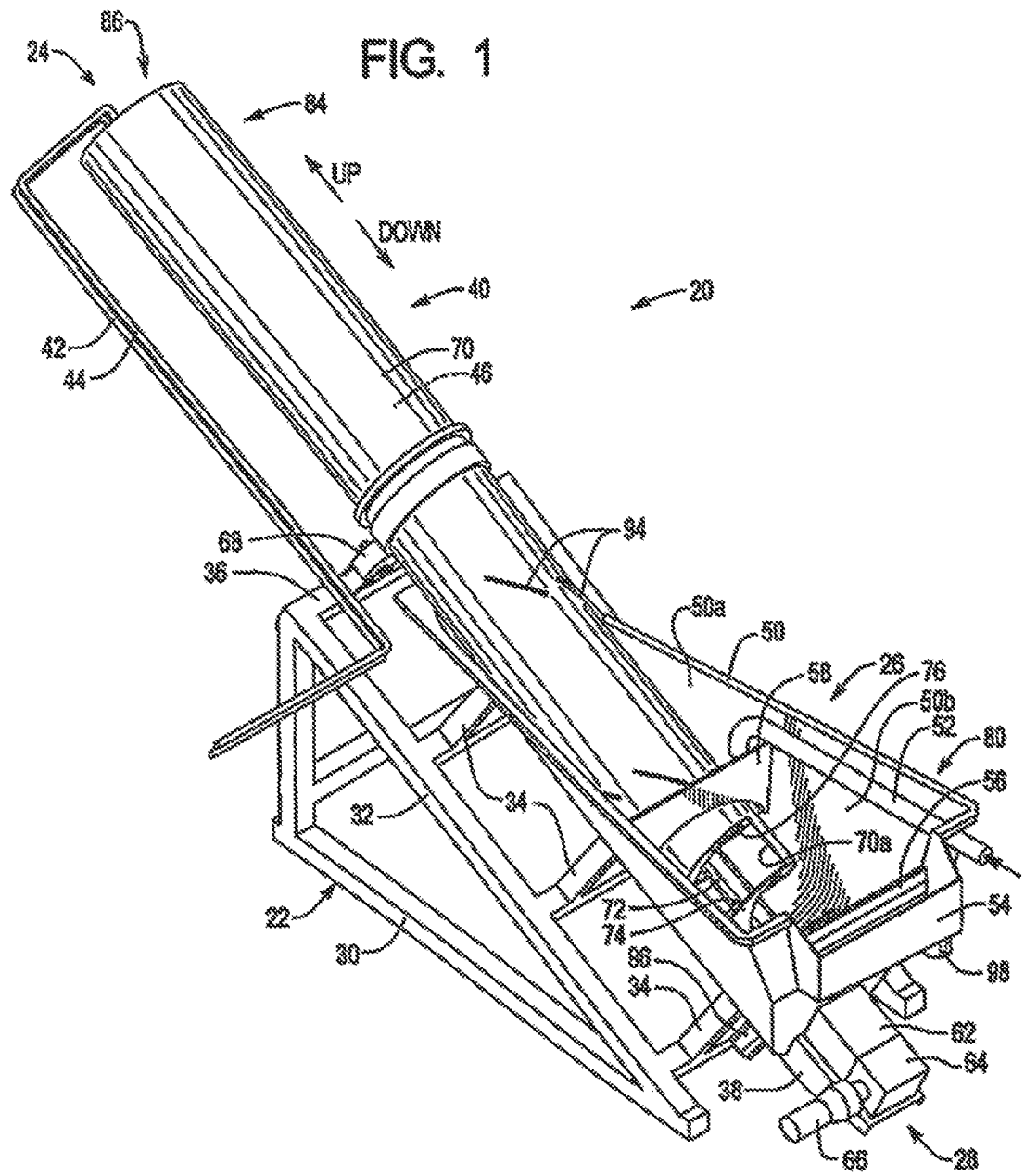
FIG. 1 is a perspective view of a first example separator system.

Referring initially to FIG. 1 of the drawing, depicted at 20 therein is a first example separator system constructed in accordance with, and embodying, the principles of the present invention. The first example separator system comprises a support frame 22, a processing system 24, a trough system 26, and a drive system 28.

In general, the support frame 22 supports the processing system 24 relative to the trough system 26 such that slurry material within the trough system 26 is fed into the processing system 24. The drive system 28 rotates at least a portion of the processing system 24 such that particulate material such as sand is extracted from the slurry material fed into and through the processing system 24.

Figure 2:
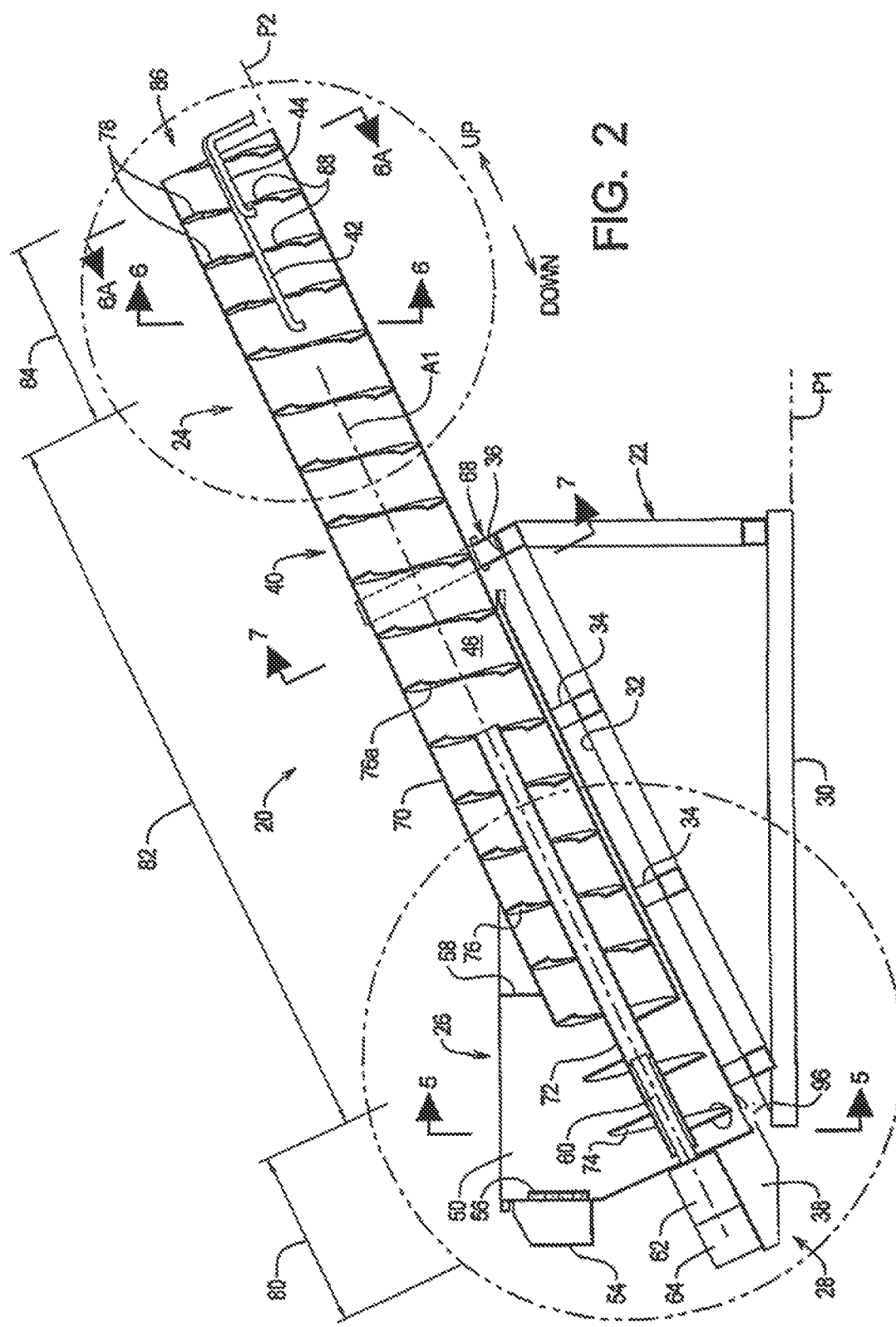
FIG. 2 is a side elevation view of the first example separator system.

The example support frame 22 defines a surface engaging portion 30, a support portion 32, cradle portions 33, a bearing surface 36, and a motor platform 38. The surface engaging portion 30 defines a reference plane P1, and the support portion 32 defines a support plane P2 that extends at an angle to the reference plane P1 (FIG. 2). The surface engaging portion 30 is adapted to be supported on a support surface such that the reference plane P1 is substantially horizontal. Accordingly, the reference plane P2 extends at an angle with respect to horizontal.

The purpose of the support frame 22 is to support the processing system 24 at a particular angle with respect to horizontal and in a desired position with respect to the trough system 26. Any structure that supports one or all of the processing, trough, and/or drive systems 24, 26, and 28 relative to horizontal and with respect to each other as generally described herein may be used in place of the example support frame 22.

FIG. 1 further shows that the example processing system 24 comprises a processing structure 40, a first processing conduit 42, and a second processing conduit 44. As perhaps best shown in FIG. 2, the processing structure 40 defines a processing axis A1 and a processing chamber 46. The example cradle portions 33 are configured to support trough system 26. The bearing surface 36 and motor platform 38 are arranged and configured such that the processing axis A1 is substantially parallel to the support plane P2 as will be described in further detail below. The processing axis A1 thus extends at an angle with respect to horizontal.

The example trough system 26 comprises a main trough 50, an inlet conduit 52, and an upper trough 54. A divider surface 56 separates the main trough 50 from the upper trough 54. A baffle 58 divides the main trough 50 into an inlet portion 50a and a feed portion 50b. The inlet conduit 52 is arranged to deposit raw slurry material into the inlet portion 50a. Raw slurry material in the inlet portion 50a flows down and under the baffle 58 before flowing into the feed portion 50b.

Figure 3:
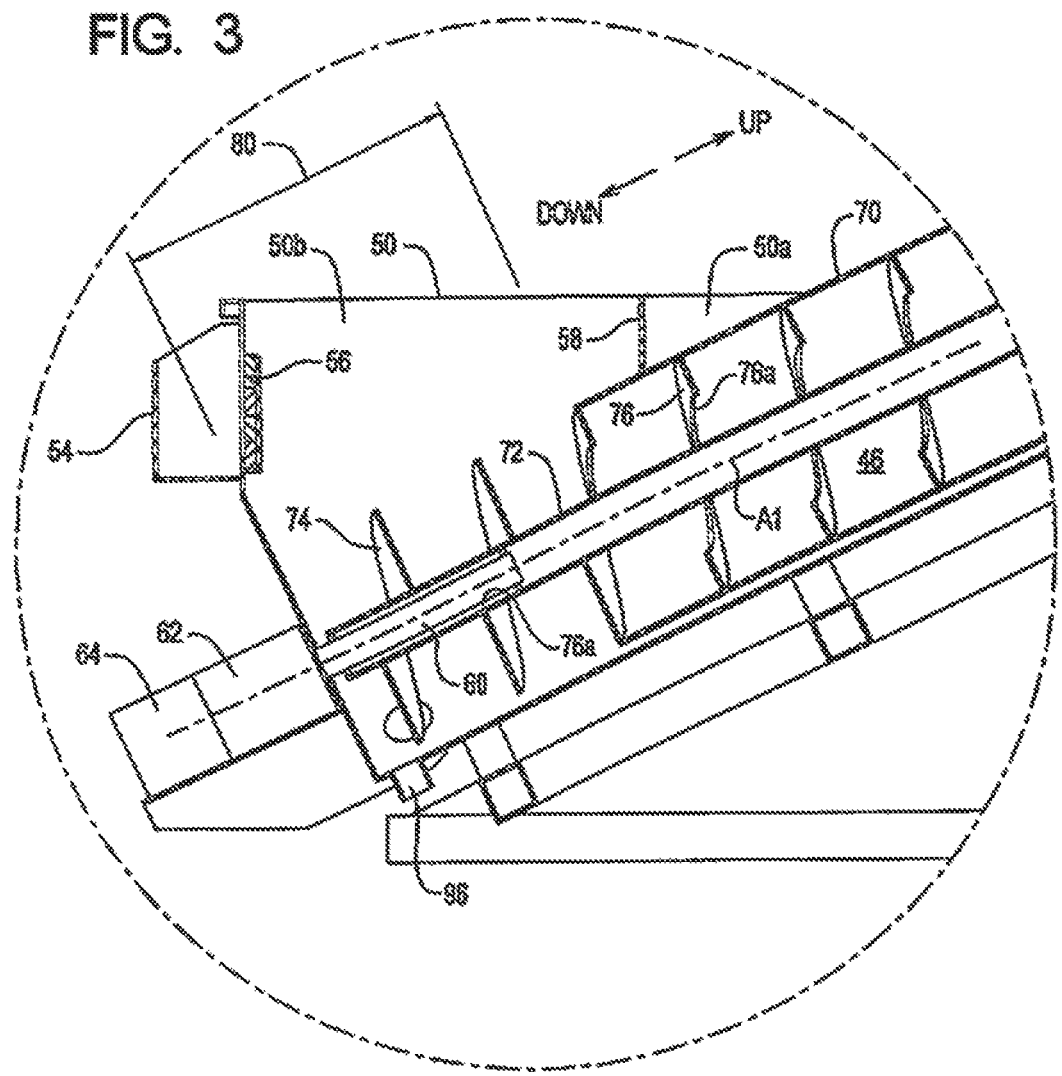
FIG. 3 is an enlarged portion of FIG. 2.
Figure 4:
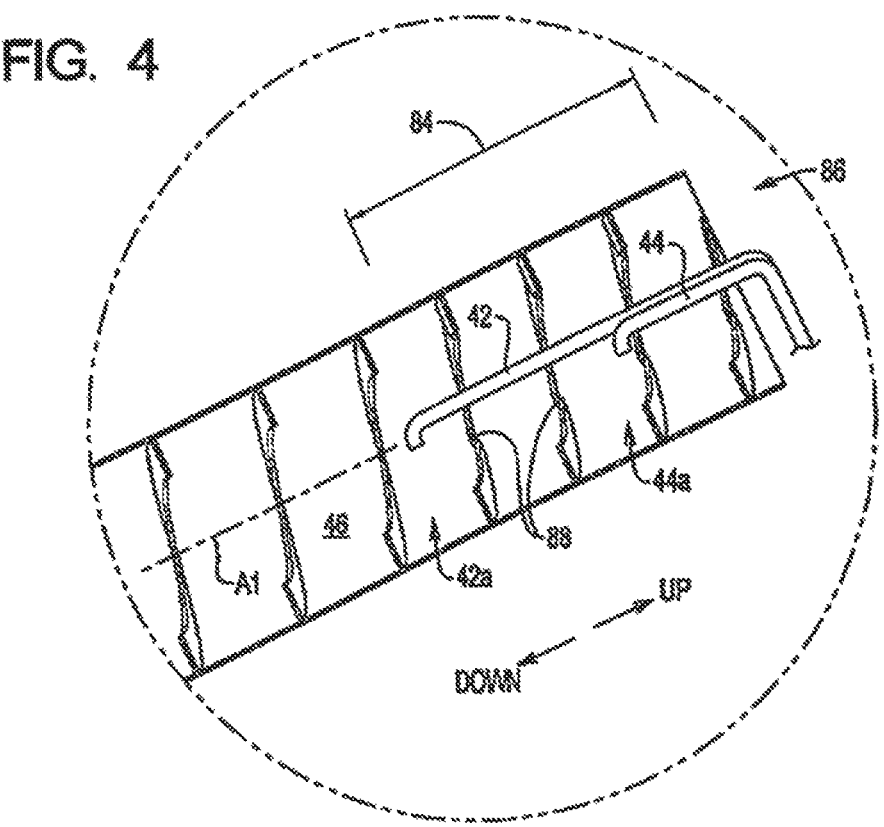
FIG. 4 is an enlarged portion of FIG. 2.
Figure 5:
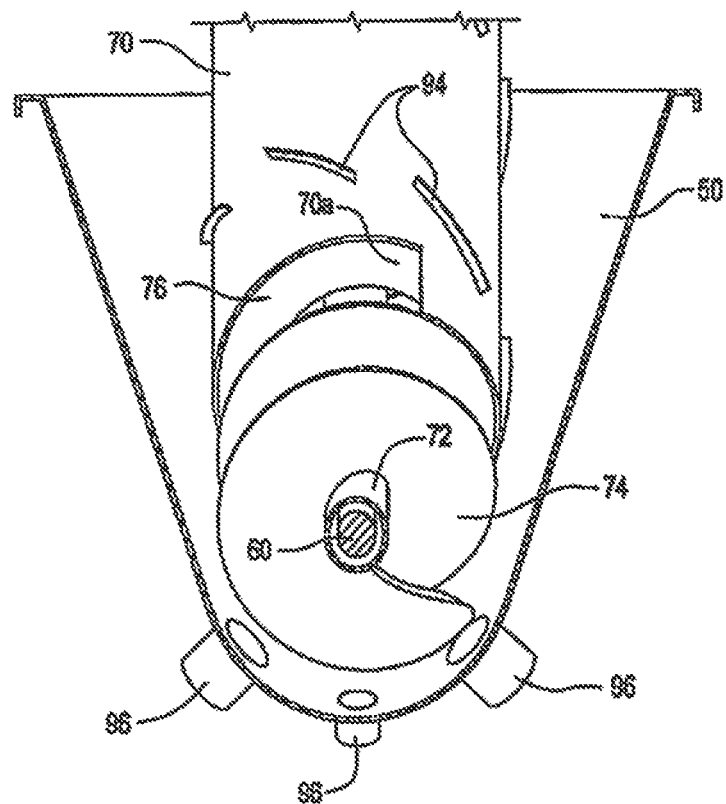
FIG. 5 is a partial cutaway, end elevation view of the first example separator system.
Figure 7:
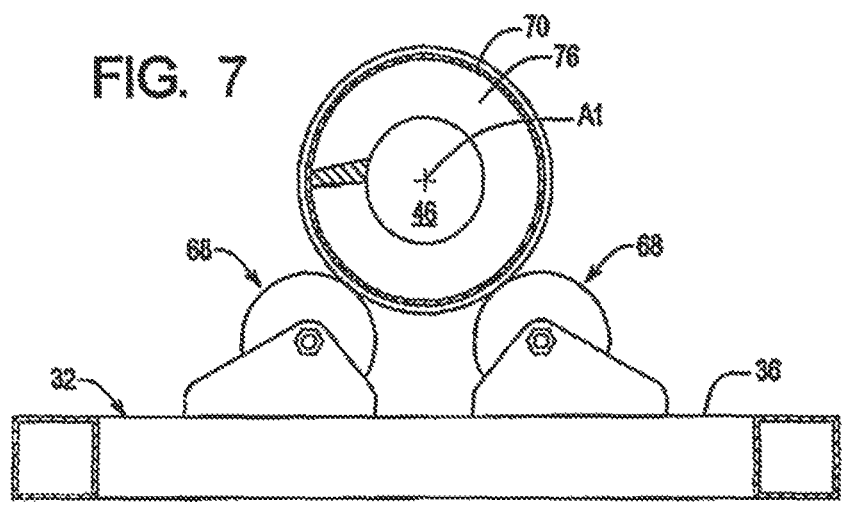
FIG. 7 is a cutaway view taken along lines 7-7 in FIG. 2.

The example drive system 28 comprises a drive shaft 60 (FIG. 3), a shaft bearing assembly 62, a transmission assembly 64, a drive motor assembly 66, and a plurality (two or more) bearing wheel assemblies 68 (FIG. 7). The drive motor assembly 66 rotates the drive shaft 60 through the transmission assembly 64. The example drive shaft 60 is connected to the processing structure 40 such that rotation of the drive shaft 60 causes rotation of the processing structure 40 about the processing axis A1. The shaft bearing assembly 62 is arranged to support the drive shaft 60 and thus an end of the processing structure 40. The bearing wheel assemblies 68 are configured to support a portion of the processing structure 40 for rotation about the processing axis A1.

The example processing structure 40 comprises a barrel member 70, a guide member 72, an auger member 74, a pre-processing member 76, and a plurality (two or more) of separator members 78. The example barrel member 70 is an elongate cylinder made of material capable of maintaining this cylindrical shape while supporting the guide member 72, auger member 74, pre-processing member 76, and separator members 78 as will be described below. The example barrel member 70 is made of steel, but other materials such as plastic or composites may be used under certain circumstances.

The barrel member 70 defines both the processing chamber 46 and the processing axis A1. The processing chamber 46 defines a feed portion 80, a pre-processing portion 82, a separator portion 84, and an outlet portion 86.

The pre-processing member 76 and separator members 78 extend into the processing chamber 46 from the interior wall of the barrel member 70. In particular, the pre-processing member 76 extends substantially radially inwardly from the barrel member 70 into part of the feed portion 80 and throughout the pre-processing portion 82 of the processing chamber 46. The example pre-processing member 76 follows a predetermined helical path defined by the diameter of the barrel member 70 and the distance between axially spaced portions of the pre-processing member 76. In the following discussion, each portion or segment of the pre-processing member 76 extending through one rotation along the helical path defines a course. These discrete portions or sections of the pre-processing member 76 may thus be referred to as courses.

The guide member 72 is rigidly secured to an inner edge 76a of the portion of the pre-processing member 76 within the feed portion 80 such that a longitudinal axis of the guide member 72 is aligned with the processing axis A1. The auger member 74 is rigidly secured to the guide member 72 such that the auger member 74 extends from the guide member 72 outside of the processing chamber 46. The example auger member 74 further follows substantially the same predetermined helical path as the pre-processing member 76. A notch 70a is formed in the barrel member 70 to create a path from the feed portion 50b of the main trough 50 into the processing chamber 46 around the auger member 74 and through the pre-processing member 76.

The separator members 78 extend generally radially inwardly from the barrel member 70 and generally follow the predetermined helical path defined by the pre-processing member 76. However, the separator members 78 are spaced from each other along the predetermined helical path and/or deviate from the predetermined helical path such that separator gaps 88 are formed between adjacent separator members 78.

Figure 6:
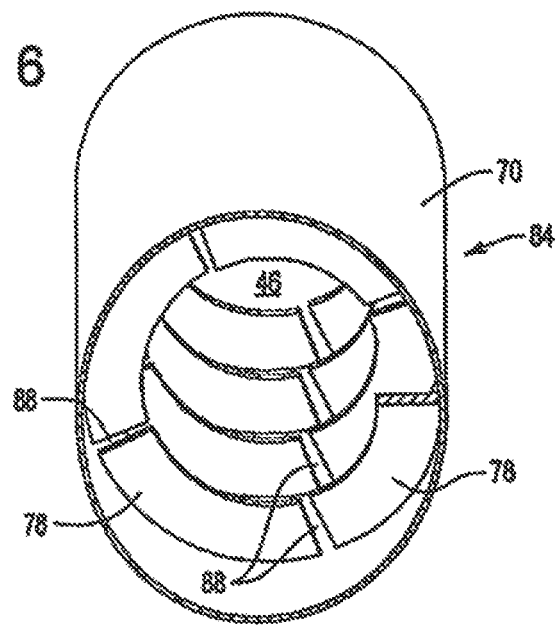
FIG. 6 is an end perspective view taken along lines 6-6 in FIG. 2.
Figure 6A:
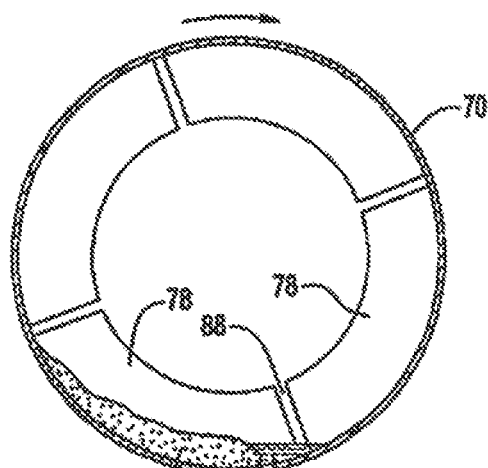
FIGS. 6A and 6B are section views taken along lines 6A-6A in FIG. 2 illustrating the separation of the raw slurry material into a thinned portion and a thickened portion.
Figure 6B:
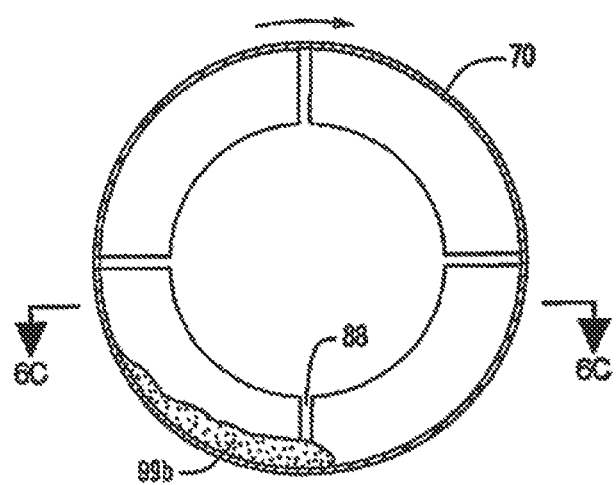
Figure 6C:
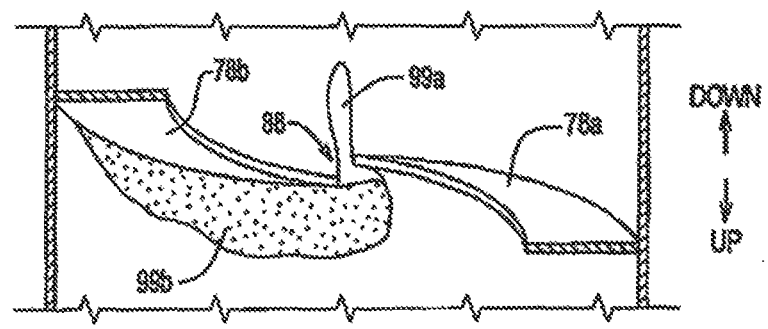
FIG. 6C is a section view taken along lines 6C-6C in FIG. 6B.
Figure 6D:
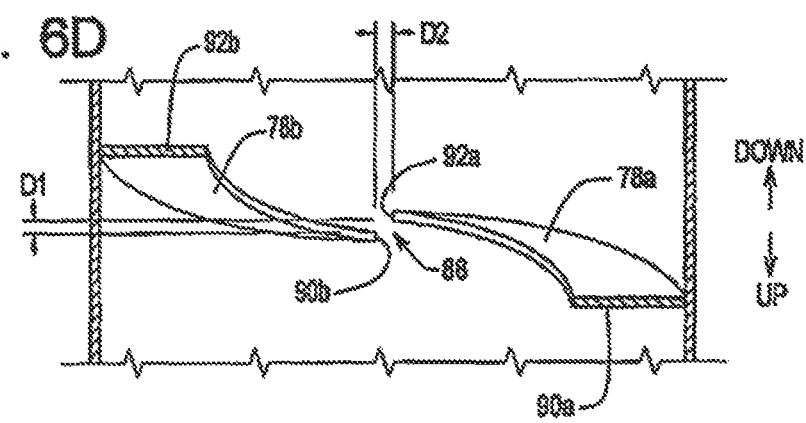
FIG. 6D is a section view similar to FIG. 6C without the raw slurry material.

In particular, first and second example separator members 78a and 78b are shown in FIG. 6D. As generally described above, the processing axis A1 extends at an angle with respect to horizontal; the processing axis A1 thus defines up and down directions as represented by arrows labeled UP and DOWN in drawing FIGS. 1-4, 6C, and 6D. In the context of any given pair of separator members, the uppermost separator member will be referred to as the as the leading separator member, while the lowermost separator member will be referred to as the trailing separator member. Using similar terminology, each separator member defines to radially aligned edges, and the uppermost of these edges will be referred to as the leading edge, while the lower most of these edges will be referred to as the trailing edge.

Accordingly, the first example separator member 78a is the leading separator member of this pair of separating members and defines a leading edge 90a and a trailing edge 92a. The second example separator member 78b is the trailing separator member in this pair and defines a leading edge 90b and a trailing edge 92b.

Using this terminology, FIG. 6D shows that the leading edge 90b of the trailing separator member 78b is above the trailing edge 92a of the leading separator member 78a by a distance D1. FIG. 6D also shows that the leading edge 90b of the trailing separator member 78b is circumferentially spaced from the trailing edge 92a of the leading separator member 78a by a distance D2. At least one of these distances D1 and D2 must be greater than zero to define the separator gap 88.

The example separator members 78 are in the shape of segments of the predetermined helical path but each helical separator member is offset from the predetermined helical path relative to the helical separators adjacent thereto. Another way of forming the separator gaps 88 is to arrange non-helical separator members along the predetermined helical path. Additionally, non-helical separator members may be offset from the predetermined helical path to form the separator gaps 88.

The example processing structure 40 further comprises cleaning blades 94 formed on the outer surface thereof. Main trough outlets 96 are formed in the main trough 50, while upper trough outlets 98 are formed in the upper trough 54.

The first example separator system 20 operates as follows. Raw slurry material is forced through the inlet conduit 52 into the inlet portion 50a of the main trough 50. The example separator system 20 is designed to process raw slurry material a liquid portion comprising at least rinse liquid, such as water, and manure and a particulate portion comprising particulate material such as sand.

The baffle 58 forces the raw slurry material to flow down to the bottom of the main trough 50 before entering the feed portion 50b of that trough 50. The main trough 50 thus functions like a gravity separator in which heavier particulate material such as sand sinks to the bottom and the liquid portion rises to the top. The flow path under the baffle 58 forces particulate material to flow to a lower portion of the trough 50 before entering the upper trough 54 as will be described in further detail below.

The support frame 22 supports the processing structure 40 such that the feed portion 80 of the processing chamber 46 is within the feed portion 50b of the main trough 50. The auger member 74 extends into the bottom of the main trough 50 with the drive shaft 60 partly within the guide member 72. In particular, the drive shaft 60 is coupled to the guide member 72 such that axial rotation of the drive shaft 60 rotates the guide member 72 about the processing axis A1. And because the guide member 72 supports the auger member 74 and pre-processing member 76, the auger member 74 and pre-processing member 76 also rotate about the processing axis A1. Similarly, the pre-processing member 76 supports the barrel member 70, so the barrel member 70 also rotates about the processing axis A1. And axial rotation of the barrel member 70 causes the separator members 78 also to rotate about the processing axis A1.

As the auger member 74 rotates about the processing axis A1, a leading surface of the auger member 74 acts on the raw slurry material within the main trough 50 to displace this raw slurry material up towards the processing chamber 46. At about the notch 70a formed in the barrel member 70, the raw slurry material displaced by the auger member 74 enters the pre-processing portion 82 of the processing chamber, where the raw slurry material is displaced through the pre-processing portion 82 by a leading surface of the pre-processing member 76.

As the pre-processing member displaces the raw slurry material up along the processing axis A1 through the pre-processing portion of the processing chamber, the particulate portion of the raw slurry material sinks in the liquid portion of the raw slurry material, separating the raw slurry material into thickened portion and a thinned portion. The thickened portion is relatively close to the inner wall of the barrel member 70, while the thinned portion is away from this inner wall. The thickened portion has a relatively high concentration of particulate material, while the thinned portion has a relatively lower concentration of the particulate material. The concentration of particulate material in the thickened portion increases as the raw slurry material proceeds up through the pre-processing portion 82 of the processing chamber 46.

Towards the lower end of the pre-processing portion 82 of the processing chamber 46, the thinned portion of the raw slurry material flows over the inner edge 76a of the pre-processing member 76 from one course of the pre-processing member 76 back down to the course below. This process begins to concentrate the particulate material within the thickened portion. At some point along the pre-processing portion 82, the thinned portion of the raw slurry material no longer flows over the inner edge 76a.

After this point, the slurry material continues to separate, with the lighter, leading portion thereof being pushed in front (i.e., in the direction opposite the direction of rotation of the barrel member) and the heavier lagging portion behind (i.e., in the direction of rotation of the barrel member).

Accordingly, by the time the raw slurry material reaches the separator portion 84, the slurry material has been thickened and separated into a leading portion and a lagging portion. The leading portion will contain a lower concentration of particulate, while the lagging portion will contain a higher concentration of particulate.

FIGS. 6A, 6B, and 6C illustrate what happens as the slurry passes through the separator portion 84 of the processing chamber 46. FIGS. 6A and 6C show the leading portion 99a of the slurry material, while FIGS. 6A, 6B, and 6C show both the leading portion 99a and the lagging portion 99b. As generally described above, rotation of the barrel member 70 causes the leading portion 99a to cross the separator gaps 88. The more fluid leading portion 99a passes through the gaps 88 to the course below. The less fluid lagging portion 99b, however, projects across the separator gap onto the next separator member 78. Accordingly, as the slurry material moves across the successive separator gaps 88 formed by the separator members 78 in the separator region, more and more of the more fluid portion flows back down through the processing chamber. The processing system 24 thus separates the particulate portion of the raw slurry material from the liquid portion of the raw slurry material.

The portion of the material raw slurry material that reaches the outlet portion 86 of the separator chamber comprises a very high proportion of the particulate portion in comparison to the proportion of the particulate material in the raw slurry material entering the feed portion 80.

In addition to separating the particulate portion from the liquid portion of the raw slurry material, the first example sand separating system 20 may be configured to clean the particulate portion and/or dilute the liquid portion. In particular, one or both of the first and second example processing conduits of the first example processing system 24 may be configured to arrange rinse liquids within the processing chamber 46.

In the example processing system 24, the first processing conduit 42 is arranged to deposit a first rinse fluid at a first location 42a within the processing chamber 46. The second processing conduit 44 is arranged to deposit a second rinse fluid at a second location 44a within the processing chamber 46. The processing system 24 may thus be operated without a supplemental rinse fluid, with either the first rinse fluid or the second rinse fluid, or with both the first and second rinse fluids.

Typically, the first location 42a at which the first rinse fluid is introduced is below the second location 44a at which the second rinse fluid. In the example processing system 24, the first location 42a is between the second location 44a and the feed portion 80, approximately at the junction of the pre-processing portion 82 and the separator portion 84. The second location is between the first location 42a and the outlet portion 86 of the processing chamber 46.

In this configuration, the second rinse fluid may be a relatively pure or clean liquid such as water while the first rinse fluid may be a relatively impure fluid that is a byproduct of the stall rinse system. The first rinse fluid will provide a fresh volume of low contaminant liquid material to facilitate separation of the particulate portion from the liquid portion of the raw slurry material. The second rinse fluid will provide a fresh volume of uncontaminated liquid material to rinse contaminants from the particulate portion of the raw slurry material. Additives such as lubricants, defoamers, disinfectants, or the like may be added to one or both of the first and second rinse fluids.

The liquid portion of the raw slurry material flows back down through the processing chamber 46 and collects in the feed portion 50b of the main trough 50. This liquid portion will collect in the upper portion of the main trough 50 and will eventually flow over the divider surface 56, into upper trough 54, and out of the system 20 through the upper trough outlets 98. The main trough outlets 96 allow material to be removed from the bottom of the main trough 50 when necessary.

Referring now to FIGS. 9-14 of the drawing, depicted at 120 therein is a second example separator system constructed in accordance with, and embodying, the principles of the present invention. The second example separator system comprises a support frame 122, a processing system 124, a trough system 126, and a drive system 128.

In general, the support frame 122 supports the processing system relative to the trough system 126 such that slurry material within the trough system 126 is fed into the processing system 124. The drive system 128 rotates at least a portion of the processing system 124 such that particulate material such as sand is extracted from the slurry material fed into and through the processing system 124.

Figure 12B:
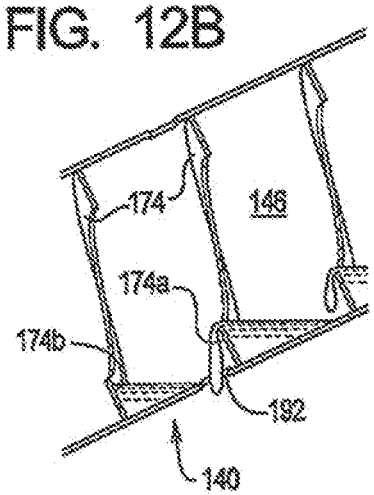
FIG. 12B is a section view of an intermediate portion of the barrel member.
Figure 12A:
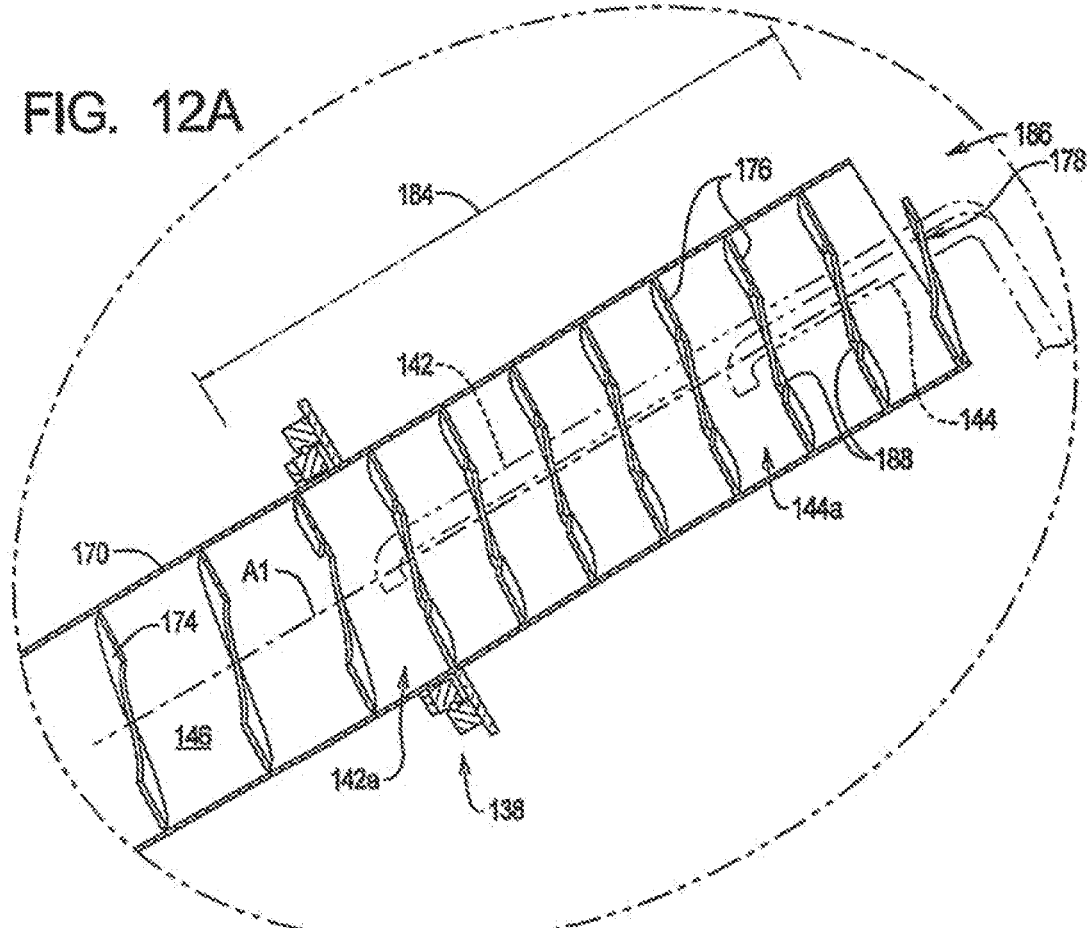
FIG. 12A is a perspective view of a distal end of a barrel member.
Figure 13:
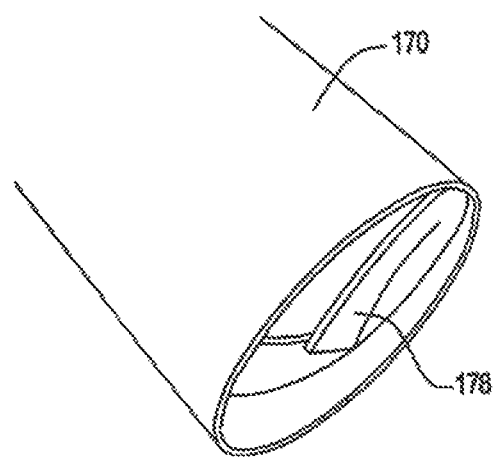
FIG. 13 is a perspective view of the distal end of a barrel member of the separator member illustrating portions of the separator members.
Figure 14:
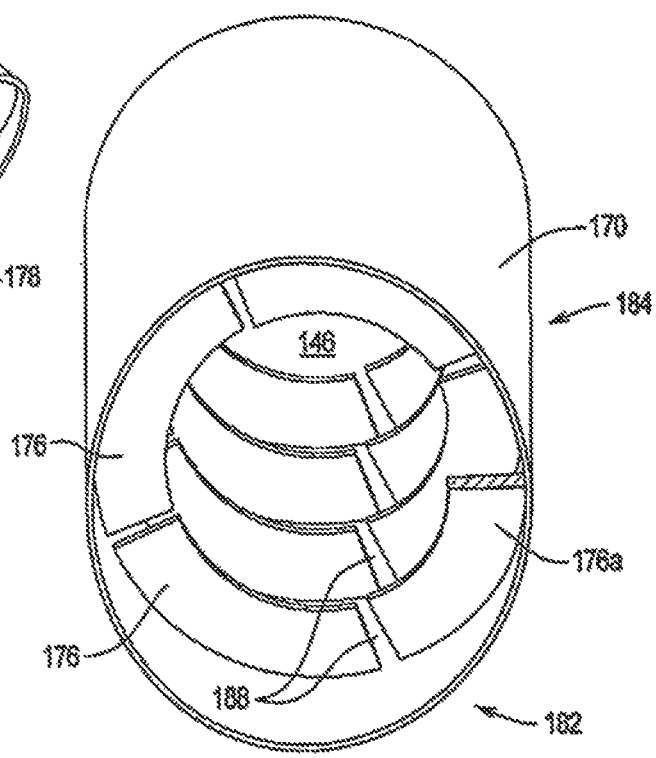
FIG. 14 is a cutaway view taken along lines 14-14 in FIG. 9.

The example support frame 122 defines a surface engaging portion 130, a support portion 132, a bearing surface 134, a motor platform 136, and brace assembly 138. The surface engaging portion 130 defines a reference plane P1, and the support portion 132 defines a support plane P2 that extends at an angle to the reference plane P1 (FIG. 12). The surface engaging portion 130 is adapted to be supported on a support surface such that the reference plane P1 is substantially horizontal. Accordingly, the reference plane P2 extends at an angle with respect to horizontal.

The purpose of the support frame 122 is to support the processing system 124 at a particular angle with respect to horizontal and in a desired position with respect to the trough system 126.

Figure 8:
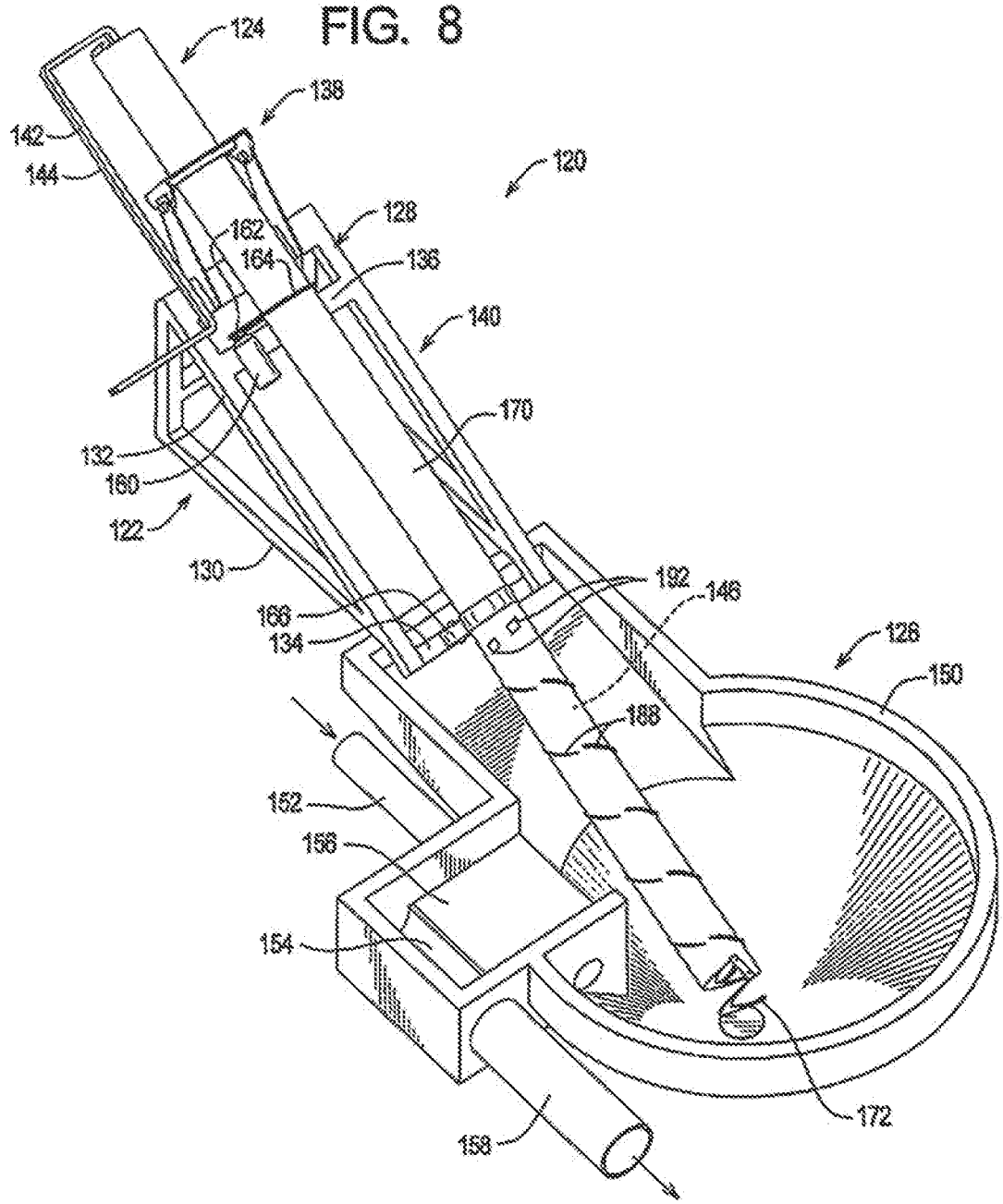
FIG. 8 is a perspective view of a second example separator system.
Figure 9:
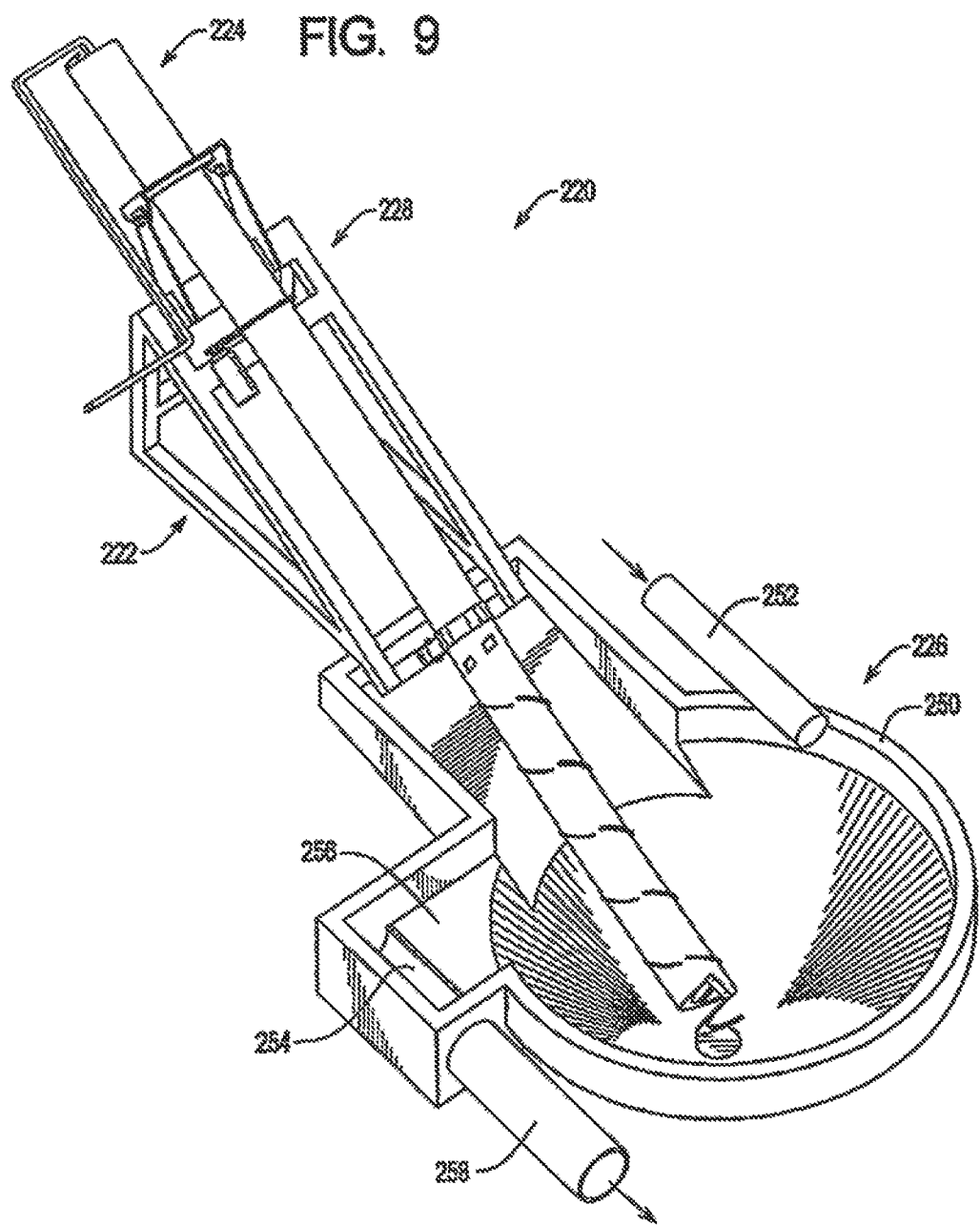
FIG. 9 is a side elevation view of the second example separator system.
Figure 10:
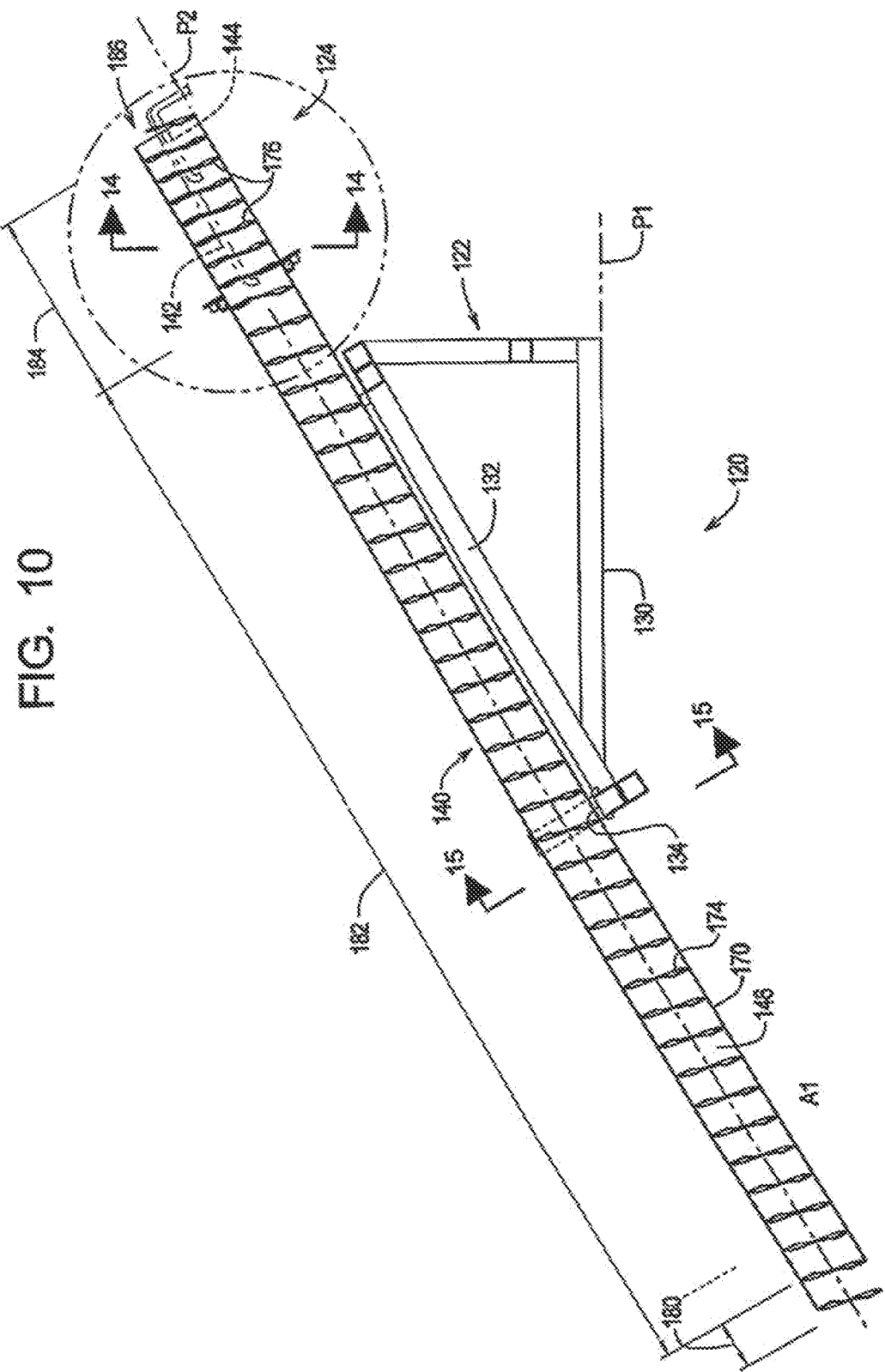
FIG. 10 is a perspective view of a proximal end of a barrel member of the separator member illustrating a portion of the pre-processing member thereof.
Figure 11:
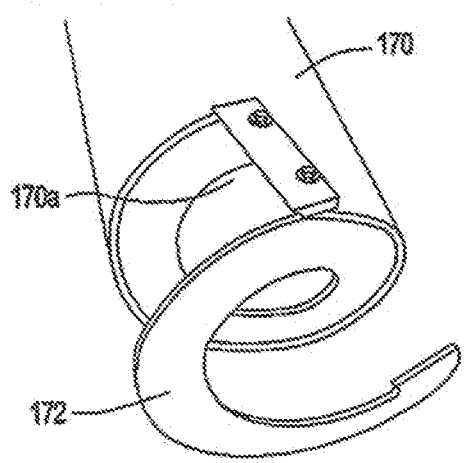
FIG. 11 is an enlarged portion of FIG. 9.

FIG. 8 further shows that the example processing system 124 comprises a processing structure 140, a first processing conduit 142, and a second processing conduit 144. As perhaps best shown in FIG. 12, the processing structure 140 defines a processing axis A1 and a processing chamber 146. The bearing surface 134 and motor platform 136 are arranged and configured such that the processing axis A1 is substantially parallel to the support plane P2 as will be described in further detail below. The processing axis A1 thus extends at an angle with respect to horizontal.

The example trough system 126 comprises a main trough 150, an inlet conduit 152, and an upper trough 154. A divider surface 156 separates the main trough 150 from the upper trough 154. The inlet conduit 152 is arranged to deposit raw slurry material into the main trough 150. An outlet conduit 158 allows fluid to flow out of the upper trough 154.

The example drive system 128 comprises a drive motor 160, a drive member 162 such as a belt or chain, a drive surface 164 such as a sprocket, and bearing wheel assemblies 166. The drive motor 160 causes rotation of the processing structure 140 through the drive member 162 and the drive surface 164. The bearing wheel assemblies 166 support the processing structure 140 for rotation about the processing axis A1.

The example processing structure 140 comprises a barrel member 170, a pre-processing member 172, a plurality (two or more) of separator members 174, an inlet member 176, and an extension portion 178. The example barrel member 170 is an elongate cylinder made of material capable of maintaining this cylindrical shape while supporting the pre-processing member 172 and separator members 174 as will be described below. The example barrel member 170 is made of steel, but other materials such as plastic or composites may be used under certain circumstances.

The barrel member 170 defines both the processing chamber 146 and the processing axis A1. The processing chamber 146 defines a feed portion 180, a pre-processing portion 182, a separator portion 184, and an outlet portion 186. Part of the pre-processing member 172 extends out of the processing chamber 146 and to define the feed portion of the processing chamber 146. The inlet member 176 is arranged adjacent to the feed portion of the processing chamber 146 and defines an inlet surface that facilitates the entry of the raw slurry material into the processing chamber 146. Part of the last separator member 174 extends out through the outlet opening 186 such that particulate material does not drop back into the separator portion 184 of the processing chamber 146.

The pre-processing member 172 and separator members 174 extend into the processing chamber 146 from the interior wall of the barrel member 170. In particular, the pre-processing member 172 extends substantially radially inwardly from the barrel member 170 into part of the feed portion 180 and throughout the pre-processing portion 182 of the processing chamber 146. The example pre-processing member 172 follows a predetermined helical path defined by the diameter of the barrel member 170 and the distance between axially spaced portions of the pre-processing member 172. In the following discussion, each portion or segment of the pre-processing member 172 extending through one rotation along the helical path defines a course. These discrete portions or sections of the pre-processing member 172 may thus be referred to as courses.

The separator members 174 extend generally radially inwardly from the barrel member 170 and generally follow the predetermined helical path defined by the pre-processing member 172. However, the separator members 174 are spaced from each other along the predetermined helical path and/or deviate from the predetermined helical path such that separator gaps 188 are formed between adjacent separator members 174.

The example processing structure 140 further comprises cleaning blades 190 formed on the outer surface thereof. In addition, as shown in FIG. 12B, openings 192 are formed in the processing structure 140. The openings 192 are arranged between downstream surface portions 174a and upstream surface portions 174b of the separator members 174. For reasons that will become apparent from the following discussion, the openings 192 are arranged immediately adjacent to the downstream surface portion 174a and are spaced a distance from the upstream surface portions 174b.

The second example separator system 120 operates in a manner that is generally similar to that of the first example separator 20 described above. Raw slurry material is forced through the inlet conduit 152 into the main trough 150. The example separator system 120 is designed to process raw slurry material a liquid portion comprising at least rinse liquid, such as water, and manure and a particulate portion comprising particulate material such as sand. The main trough 150 functions like a gravity separator in which heavier particulate material such as sand sinks to the bottom and the liquid portion rises to the top.

The support frame 122 supports the processing structure 140 such that the feed portion 180 of the processing chamber 146 is within the main trough 150. Rotation of the barrel member 170 causes the particulate portion of the raw slurry material to move up through the processing chamber 146 and out of the outlet portion 186. As generally described above, the portion of the material raw slurry material that reaches the outlet portion 186 of the separator chamber comprises a very high proportion of the particulate portion in comparison to the proportion of the particulate material in the raw slurry material entering the feed portion 180.

In addition to separating the particulate portion from the liquid portion of the raw slurry material, the second example sand separating system 120 may be configured to clean the particulate portion and/or dilute the liquid portion. In particular, one or both of the first and second example processing conduits of the second example processing system 124 may be configured to arrange rinse liquids within the processing chamber 146.

In the example processing system 124, the first processing conduit 142 is arranged to deposit a first rinse fluid at a first location 142a within the processing chamber 146. The second processing conduit 144 is arranged to deposit a second rinse fluid at a second location 144a within the processing chamber 146. The processing system 124 may thus be operated without a supplemental rinse fluid, with either the first rinse fluid or the second rinse fluid, or with both the first and second rinse fluids.

Typically, the first location 142a at which the first rinse fluid is introduced is below the second location 144a at which the second rinse fluid. In the example processing system 124, the first location 142a is between the second location 144a and the feed portion 180, approximately at the junction of the pre-processing portion 182 and the separator portion 184. The second location is between the first location 142a and the outlet portion 186 of the processing chamber 146.

In this configuration, the second rinse fluid may be a relatively pure or clean liquid such as water while the first rinse fluid may be a relatively impure fluid that is a byproduct of the stall rinse system. The first rinse fluid will provide a fresh volume of low contaminant liquid material to facilitate separation of the particulate portion from the liquid portion of the raw slurry material. The second rinse fluid will provide a fresh volume of uncontaminated liquid material to rinse contaminants from the particulate portion of the raw slurry material. Additives such as lubricants, defoamers, disinfectants, or the like may be added to one or both of the first and second rinse fluids.

The liquid portion of the raw slurry material flows back down through the processing chamber 146 and collects in the main trough 150. This liquid portion will collect in the upper portion of the main trough 150 and will eventually flow over the divider surface 156, into upper trough 154, and out of the system 120 through the upper trough outlet 158.

As shown in FIG. 12B, the openings 192 formed in the processing structure 140 are configured to allow a portion of the material supported against the upstream surface portions 174b to flow out of the processing chamber 146. The purpose of these openings 192 is to allow certain solid particulate materials such as corn in the liquid portion of the raw slurry flowing back down through the processing chamber 146 to be removed therefrom.

Figure 15:
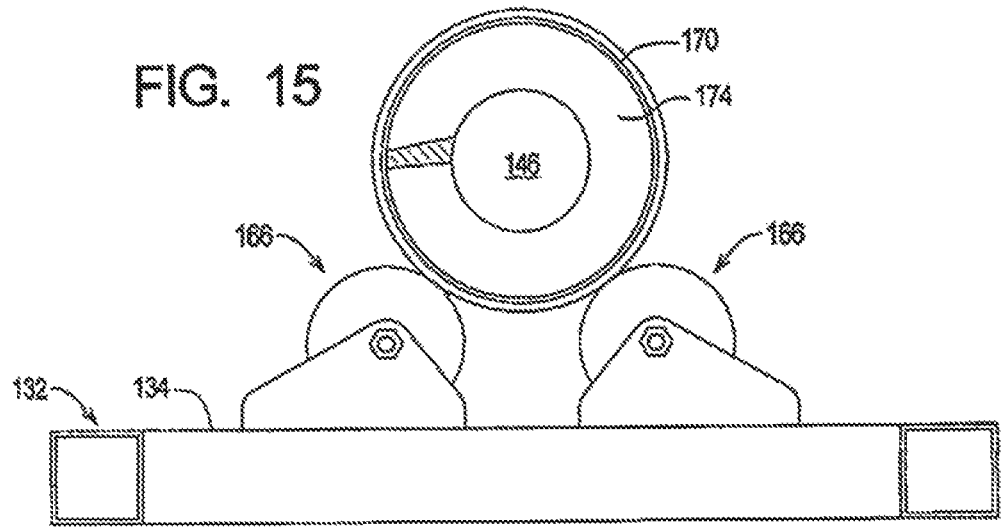
FIG. 15 is a section view taken along lines 15-15 in FIG. 10.

Referring now to FIG. 15 of the drawing, depicted at 220 therein is a second example separator system constructed in accordance with, and embodying, the principles of the present invention. The second example separator system comprises a support frame 222, a processing system 224, a trough system 226, and a drive system 228. The processing system 224 and drive system 228 are or may be the same as the processing system 124 and drive system 128 described above and will not be described herein in detail.

The example trough system 226 comprises a main trough 250, an inlet conduit 252, and an upper trough 254. A divider surface 256 separates the main trough 250 from the upper trough 254. The inlet conduit 252 is arranged to deposit raw slurry material into the main trough 250. An outlet conduit 258 allows fluid to flow out of the upper trough 254. In the example trough system 226, the inlet conduit 252 is arranged such that the main trough 250 is gravity fed. Raw slurry material entering the main trough flows down and around a conical surface defined by the main trough 250 so that the particulate material has time to sink to the bottom of the main trough 250 and be taken in by the processing system 224.

Figure 16:
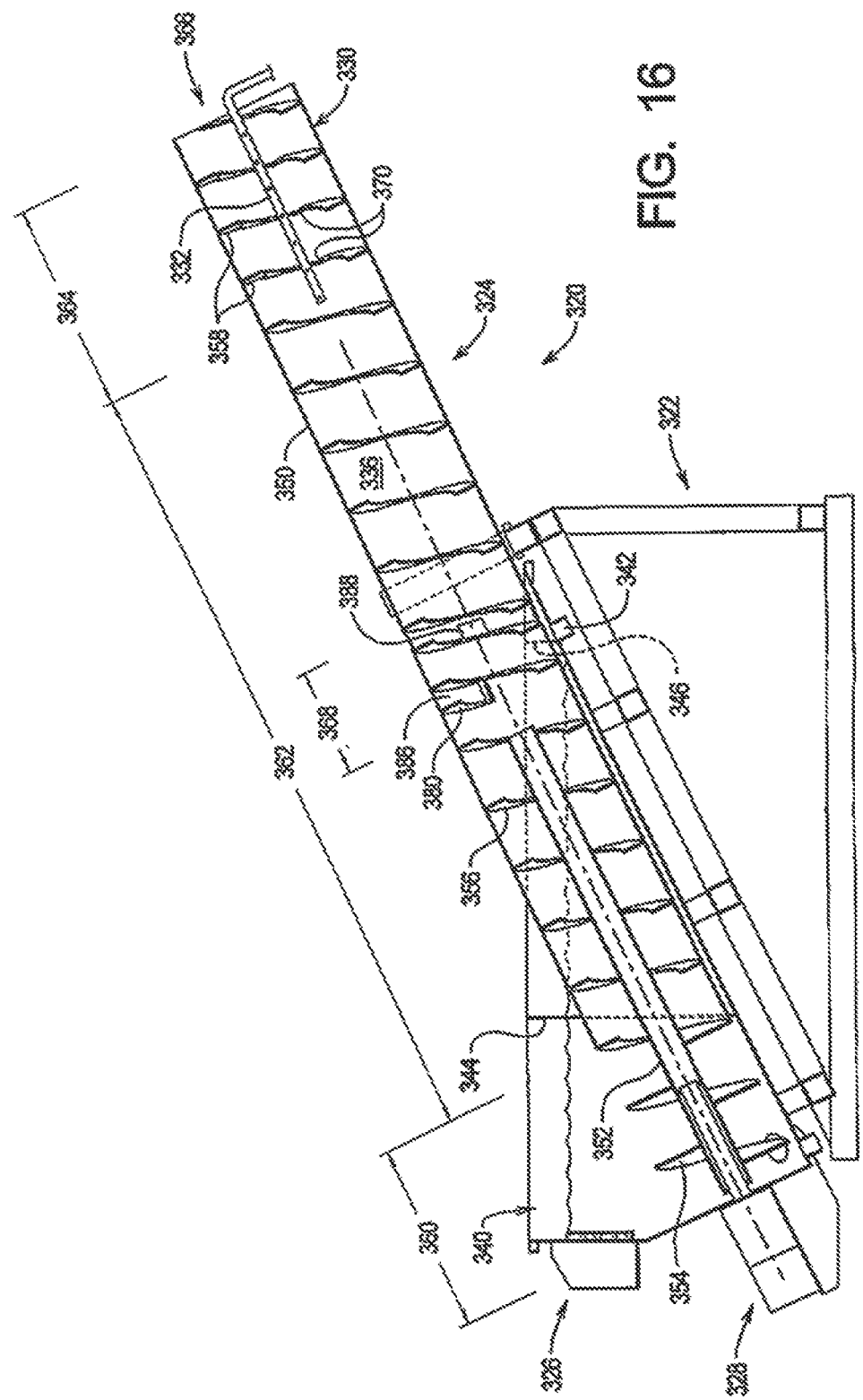
FIG. 16 is a side elevation view of a third example particulate separator system.

Referring now to FIGS. 16-18 of the drawing, depicted at 320 therein is a third example particulate separator system constructed in accordance with, and embodying, the principles of the present invention. One problem with a separator system such as the separator system 20 described above is that lighter particulate materials contained within the raw slurry material are not effectively removed and can clog the feed portion of the processing chamber. One such solid material is corn. Corn is commonly used as an animal feed, and a typical raw slurry material generated by a dairy operation will contain a certain percentage of corn. Corn kernels are too light to be separated using the separator system 20 as described above and tend to flow back towards the intake portion. Eventually, enough of these lighter particulate materials accumulate in the main trough 50 that function of the system 20 is compromised. The fourth example particulate separator system is designed to reduce accumulation of lighter particulate materials in the main trough.

As shown in FIG. 16, the third example separator system 320 comprises a support frame 322, a processing system 324, a trough system 326, and a drive system 328. The third example separator system 320 is similar to the first example particulate separator system 20 described above and will be described primarily to the extent that it differs from the first example separator system 20 described above.

FIG. 16 further shows that the example processing system 324 comprises a processing structure 330 and a processing conduit 332. Operation of the example drive system 328 causes rotation of the processing structure 330 about a processing axis. The example trough system 326 comprises a main trough 340 and a drain conduit 342. A baffle 344 and a wall 346 are formed in the trough system 326.

The example processing structure 330 comprises a barrel member 350, a guide member 352, an auger member 354, a pre-processing member 356, and a plurality (two or more) of separator members 358. The example barrel member 350 is an elongate cylinder made of material capable of maintaining this cylindrical shape while supporting the guide member 352, auger member 354, pre-processing member 356, and separator members 358. The barrel member 350 defines both the main processing chamber 336 and a processing axis. The main processing chamber 336 defines a feed portion 360, a pre-processing portion 362, a separator portion 364, an outlet portion 366, and a secondary processing portion 368 within the pre-processing portion 362.

The pre-processing member 356 and separator members 358 extend generally inwardly radially into the main processing chamber 336 from the interior wall of the barrel member 350. The separator members 358 extend generally radially inwardly from the barrel member 350 and generally follow the predetermined helical path defined by the pre-processing member 356. However, the separator members 358 are spaced from each other along the predetermined helical path and/or deviate from the predetermined helical path such that separator gaps 370 are formed between adjacent separator members 358.

The first example separator system 320 operates as follows. Raw slurry material is introduced into an inlet portion of the main trough 340. The example separator system 320 is designed to process raw slurry material comprising a liquid portion comprising at least rinse liquid such as water, manure, a heavier particulate portion comprising particulate material such as sand, and a lighter particulate portion comprising a particulate material such as feed corn.

The baffle 344 forces the raw slurry material to flow down to the bottom of the main trough 340 before entering a feed portion of that trough 340. The main trough 340 thus functions like a gravity separator in which heavier particulate material such as sand sinks to the bottom and the liquid portion rises to the top.

The support frame 322 supports the processing structure 330 at an angle such that the feed portion 360 of the main processing chamber 336 is within the feed portion of the main trough 340 and the outlet portion 366 extends into the air away from the main trough 340. The auger member 354 extends into the bottom of the main trough 340.

As the auger member 354 rotates about the processing axis, a leading surface of the auger member 354 acts on the raw slurry material within the main trough 340 to displace this raw slurry material up towards the main processing chamber 336. At about the notch 350*a* formed in the barrel member 350, the raw slurry material displaced by the auger member 354 enters the pre-processing portion 362 of the processing chamber, where the raw slurry material is displaced through the pre-processing portion 362 by a leading surface of the pre-processing member 356.

The pre-processing member 356 displaces the raw slurry material up along the processing axis through the pre-processing portion 362 of the main processing chamber 336. As the slurry material is displaced upwardly along the processing axis, the particulate portion of the raw slurry material sinks in the liquid portion of the raw slurry material, separating the raw slurry material into thickened portion and a thinned portion. The thickened portion is relatively close to the inner wall of the barrel member 350, while the thinned portion is away from this inner wall. The thickened portion has a relatively high concentration of heavier particulate material, while the thinned portion has a relatively lower concentration of the heavier particulate material. The concentration of heavier particulate material in the thickened portion increases as the raw slurry material proceeds up through the pre-processing portion 362 of the main processing chamber 336. However, the thinned portion contains a relatively higher percentage of the lighter particulate materials in the raw slurry material.

Towards the lower end of the pre-processing portion 362 of the main processing chamber 336, the thinned portion of the raw slurry material flows over the inner edge 356*a* of the pre-processing member 356 from one course of the pre-processing member 356 back down to the course below. This process rinses impurities from the raw slurry material and begins to concentrate the heavier particulate material within the thickened portion. At some point towards the upper end of the pre-processing portion 362, the thinned portion of the raw slurry material no longer flows over the inner edge 356*a*. On the other hand, this process tends to concentrate the lighter particulate material within the thinned portion, and the thinned portion carries the lighter particulate material downward through the main processing chamber 336.

In the separator portion 364 above the pre-processing portion 362, the slurry material continues to separate, with the lighter, leading portion thereof being pushed in front (i.e., in the direction opposite the direction of rotation of the barrel member) and the heavier lagging portion behind (i.e., in the direction of rotation of the barrel member).

Accordingly, by the time the raw slurry material reaches the separator portion 364, the thickened portion of the slurry material has separated into a thinner leading portion a relatively lower concentration of heavier particulate material and a thicker lagging portion comprising a relatively higher concentration of heavier particulate material. And, although much lighter particulate material has been removed at this point, the leading portion will likely contain a higher concentration of any remaining lighter particulate material, while the lagging portion will likely contain a lower concentration of the lighter particulate material. The leading portion of the thickened raw slurry material within the separator portion falls through the separator gaps 370, while the lagging portion is passed from one separator member 358 over the separator gaps 370.

As shown in FIGS. 16-19, the third example separator system 320 comprises a secondary processing member 380 arranged immediately behind at least a portion of the pre-processing member 356 in the secondary processing portion 368 of the main processing chamber 336. The example secondary processing member 380 is shaped like the pre-processing member 356 and, like the pre-processing member 356, is secured to the interior wall of the barrel member 350. End plates 382 and 384 are further secured to the interior wall of the barrel member 350 such that these plates 382 and 384 extend between the pre-processing member 356 and the ends of the secondary processing member 380.

The pre-processing member 356, the secondary processing member 380, and the end plates 382 and 384 thus define a secondary processing chamber 386 within the main processing chamber 336. The example secondary processing chamber 386 defines a shallow, helical trough with an open side facing radially inwardly. This trough extends around at least one, and preferably at least one and one-quarter, revolutions or courses of the pre-processing member 356. One or more secondary processing openings 388 are formed in the barrel member 350 within the secondary processing chamber 386 adjacent to a portion of the pre-processing member 356. In the following discussion, the portion of the pre-processing member 356 adjacent to the one or more secondary openings 388 will be referred to as a first portion 356a of the pre-processing member 356, while the portion of the pre-processing member 356 adjacent to the secondary processing member 380 will be referred to as a second portion 356b of the pre-processing member 356.

The purpose of the secondary processing chamber 386 and the secondary processing openings 388 is to alleviate the clogging caused by light particulate materials such as corn. As perhaps best shown in FIG. 19, rotation of the barrel member 350 causes the raw slurry material to be displaced upward along the main processing chamber 336. However, the end plates 382 and 384 prevent the raw slurry material carried upward by the pre-processing member 356 from entering the secondary processing chamber 386. The raw slurry material carried by the pre-processing material thus bypasses the secondary processing chamber 386 on the way up through the processing chamber 336.

However, as the raw slurry material passes around the secondary processing chamber 386 while traveling up through the main processing chamber 336, the raw slurry material mixes with rinse liquids introduced into the separator portion 364 of the main processing chamber 336 by the processing conduit 332. The raw slurry material and rinse liquids are mixed and allow separation of the heavier particulate materials from the liquid materials as generally described above with reference to the first example separator system 20.

Above the secondary processing chamber 386, the lighter particulate materials will float to the top of the mixture of raw slurry material and rinse liquids. The lighter particulate materials will thus flow down through the main processing chamber 336 by flowing or spilling over the inner edge 356a of the pre-processing member 356 with the liquid portion of the raw slurry material and the rinse liquids.

Thus, the liquid portion of the raw slurry material, rinse liquids, and these lighter particulate materials will flow or spill over the inner edge of the pre-processing member 356 and into the secondary processing chamber 386. However, the heavier particulate materials, such as sand, sink to the bottom of the slurry and rinse liquids being displaced or carried upwards by the pre-processing member 356 and thus do not flow over the inner edge 356a and into the secondary processing chamber 386. As the barrel member 350 rotates, the slurry liquids, rinse liquids, and lighter particulate materials eventually flow out of the pre-processing member 356, through the shallow trough formed by the secondary processing chamber 386, and then through the secondary processing openings 388. At least one and preferably two to three of the secondary processing openings 388 are formed to allow the material collected by the secondary processing chamber 386 to flow out of these openings as the barrel member 350 rotates.

The drain conduit 342 is arranged below the secondary processing openings 388. Accordingly, any materials flowing out of the secondary processing openings 388 fall into the drain conduit 342 and may be reused, recycled, or disposed of. The wall 346 prevents materials flowing into the drain conduit 342 from flowing into the main trough 340. Materials collected by the secondary processing chamber 386 are thus prevented from reaching the feed portion of the main trough 340. Much of the light particulate in the raw slurry material is collected by the secondary processing chambers and is thus prevented from collecting in and clogging the main trough 340.

Referring now to FIG. 20 of the drawing, depicted at 420 therein is a fourth example separator system constructed in accordance with, and embodying, the principles of the present invention. The fourth example separator system 420 comprises a support frame 422, a processing system 424, a trough system 426, and a drive system (not shown). The fourth example separator system 420 is similar to the second example separator system 120 described above and will be described herein primarily to the extent that the system 420 differs from the previously described system 120.

The purpose of the support frame 422 is to support the processing system 424 at a particular angle with respect to horizontal and in a desired position with respect to the trough system 426. FIG. 20 further shows that the example processing system 424 comprises a processing structure 430 and a processing conduit 432. The processing structure 430 defines a processing axis and a main processing chamber 434. The example trough system 426 comprises a main trough 440 and a secondary trough 442.

The example processing structure 430 comprises a barrel member 450, a pre-processing member 452, a plurality (two or more) of separator members 454, an inlet member 456, and an extension portion 458. The example barrel member 450 is an elongate cylinder made of material capable of maintaining this cylindrical shape while supporting the pre-processing member 452 and separator members 454 as will be described below. The example barrel member 450 is made of steel, but other materials such as plastic or composites may be used under certain circumstances.

The barrel member 450 defines both the main processing chamber 434 and the processing axis. The main processing chamber 434 defines a feed portion 470, a pre-processing portion 472, a separator portion 474, an outlet portion 476, and a lower secondary processing portion 478. Part of the pre-processing member 452 extends out of the main processing chamber 434 to define the feed portion of the main processing chamber 434. The inlet member 456 is arranged adjacent to the feed portion of the main processing chamber 434 and defines an inlet surface that facilitates the entry of the raw slurry material into the main processing chamber 434. Part of the last separator member 454 extends out through the outlet opening 476 such that particulate material does not drop back into the separator portion 474 of the main processing chamber 434.

The pre-processing member 452 and separator members 454 extend into the main processing chamber 434 from the interior wall of the barrel member 450. In particular, the pre-processing member 452 extends substantially radially inwardly from the barrel member 450 into part of the feed portion 470 and throughout the pre-processing portion 472 of the main processing chamber 434. The example pre-processing member 452 follows a predetermined helical path defined by the diameter of the barrel member 450 and the distance between axially spaced portions of the pre-processing member 452. In the following discussion, each portion or segment of the pre-processing member 452 extending through one rotation along the helical path defines a course. These discrete portions or sections of the pre-processing member 452 may thus be referred to as courses.

The separator members 454 extend generally radially inwardly from the barrel member 450 and generally follow the predetermined helical path defined by the pre-processing member 452. However, the separator members 454 are spaced from each other along the predetermined helical path and/or deviate from the predetermined helical path such that separator gaps 460 are formed between adjacent separator members 454.

FIG. 20 further shows that the fourth example separator system 420 comprises a secondary processing member 480 arranged immediately behind at least a portion of the pre-processing member 452 in the secondary processing portion 478 of the main processing chamber 434. The example secondary processing member 480 is shaped like the pre-processing member 452 and, like the pre-processing member 452, is secured to the interior wall of the barrel member 450. A first end plates 482 and a second end plate (not shown) are further secured to the interior wall of the barrel member 450 such that these plates extend between the pre-processing member 452 and the ends of the secondary processing member 480.

The pre-processing member 452, the secondary processing member 480, and the end plates thus define a secondary processing chamber 486 within the main processing chamber 434. The example secondary processing chamber 486 defines a shallow, helical trough with an open side facing radially inwardly. This trough extends around at least one, and preferably at least one and one-quarter, revolutions or courses of the pre-processing member 452. Additionally, one or more secondary processing openings 488 are formed in the barrel member 450 within the secondary processing chamber 486. The purpose of the secondary processing chamber 486 and the secondary processing openings 488 is to alleviate the clogging caused by light particulate materials such as corn.

As with the system 320 described above, rotation of the barrel member 450 causes the raw slurry material to be displaced upward along the main processing chamber 434. However, the end plates prevent the raw slurry material carried upward by the pre-processing member 452 from entering the processing chambers. The raw slurry material carried by the pre-processing material thus bypasses the secondary processing chambers on the way up through the main processing chamber 434.

However, as the raw slurry material passes around the secondary processing chambers while traveling up through the main processing chamber 434, the raw slurry material mixes with rinse liquids introduced into the separator portion 474 of the main processing chamber 434 by the processing conduit 432. The raw slurry material and rinse liquids are mixed and allow separation of the heavier particulate materials from the liquid materials as generally described above with reference to the first example separator system 20.

Above the secondary processing chambers, the lighter particulate materials will float to the top of the mixture of raw slurry material and rinse liquids. The lighter particulate materials will thus flow down through the main processing chamber 434 over the inner edge 452a of the pre-processing member 452 with the liquid portion of the raw slurry material and the rinse liquids.

Thus, the liquid portion of the raw slurry material, rinse liquids, and these lighter particulate materials will flow over the inner edge of the pre-processing member 452 and into the secondary processing chamber 486. However, the heavier particulate materials, such as sand, do not flow over the inner edge 452a into the secondary processing chamber. As the barrel member 450 rotates, the slurry liquids, rinse liquids, and lighter particulate materials eventually flow out of the proc-processing member 452 through the secondary processing openings 488. At least one and preferably two to three of the secondary processing openings 488 are formed in each of the secondary processing chambers.

The secondary trough 442 is arranged below the secondary processing openings 488 of the secondary processing chamber 486. Accordingly, any materials flowing out of the secondary processing openings 488 are collected by the trough 442 for reuse, recycling, or disposal. Materials collected by the secondary processing chambers are thus prevented from reaching the main chamber 440. Much of the light particulate in the raw slurry material is collected by the secondary processing chambers and is thus prevented from collecting in and clogging the main chamber 440.

Referring now to FIG. 21 of the drawing, depicted at 520 therein is a fifth example separator system constructed in accordance with, and embodying, the principles of the present invention. The fifth example separator system 520 comprises a support frame 522, a processing system 524, a trough system 526, and a drive system (not shown). The fifth example separator system 520 is similar to the second example separator system 420 described above and will be described herein primarily to the extent that the system 520 differs from the previously described systems 420.

The purpose of the support frame 522 is to support the processing system 524 at a particular angle with respect to horizontal and in a desired position with respect to the trough system 526. FIG. 21 further shows that the example processing system 524 comprises a processing structure 530 and a processing conduit 532. The processing structure 530 defines a processing axis and a main processing chamber 534. The example trough system 526 comprises a main trough 540, a lower secondary trough 542, and an upper secondary trough 544.

The example processing structure 530 comprises a barrel member 550, a pre-processing member 552, a plurality (two or more) of separator members 554, an inlet member 556, and an extension portion 558. The example barrel member 550 is an elongate cylinder made of material capable of maintaining this cylindrical shape while supporting the pre-processing member 552 and separator members 554 as will be described below. The example barrel member 550 is made of steel, but other materials such as plastic or composites may be used under certain circumstances.

The barrel member 550 defines both the main processing chamber 534 and the processing axis. The main processing chamber 534 defines a feed portion 570, a pre-processing portion 572, a separator portion 574, an outlet portion 576, and a lower secondary processing portion 578a, and an upper secondary processing portion 578b. Part of the pre-processing member 552 extends out of the main processing chamber 534 and to define the feed portion of the main processing chamber 534. The inlet member 556 is arranged adjacent to the feed portion of the main processing chamber 534 and defines an inlet surface that facilitates the entry of the raw slurry material into the main processing chamber 534. Part of the last separator member 554 extends out through the outlet opening 576 such that particulate material does not drop back into the separator portion 574 of the main processing chamber 534.

The pre-processing member 552 and separator members 554 extend into the main processing chamber 534 from the interior wall of the barrel member 550. In particular, the pre-processing member 552 extends substantially radially inwardly from the barrel member 550 into part of the feed portion 570 and throughout the pre-processing portion 572 of the main processing chamber 534. The example pre-processing member 552 follows a predetermined helical path defined by the diameter of the barrel member 550 and the distance between axially spaced portions of the pre-processing member 552. In the following discussion, each portion or segment of the pre-processing member 552 extending through one rotation along the helical path defines a course. These discrete portions or sections of the pre-processing member 552 may thus be referred to as courses.

The separator members 554 extend generally radially inwardly from the barrel member 550 and generally follow the predetermined helical path defined by the pre-processing member 552. However, the separator members 554 are spaced from each other along the predetermined helical path and/or deviate from the predetermined helical path such that separator gaps 560 are formed between adjacent separator members 554.

FIG. 21 further shows that the fifth example separator system 520 comprises a lower secondary processing member 580a and an upper secondary processing member 580b arranged immediately behind at least a portion of the pre-processing member 552 in the lower and upper secondary processing portions 578a and 578b of the main processing chamber 534, respectively. The example secondary processing members 580a and 580b are shaped like the pre-processing member 552 and, like the pre-processing member 552, are secured to the interior wall of the barrel member 550. First end plates 582a and 582b and second end plates (not shown) are further secured to the interior wall of the barrel member 550 such that these plates extend between the pre-processing member 552 and the ends of each of the secondary processing members 580a and 580b.

The pre-processing member 552, the secondary processing members 580a and 580b, and the end plates thus define first and second secondary processing chambers 586a and 586b within the main processing chamber 534. The example secondary processing chambers 576a and 576b each define shallow, helical troughs with an open side facing radially inwardly. These troughs extend around at least one, and preferably at least one and one-quarter, revolutions or courses of the pre-processing member 552. Additionally, one or more secondary processing openings 588 are formed in the barrel member 550 within each of the secondary processing chambers 586a and 586b. The purpose of the secondary processing chambers 586a and 586b and the secondary processing openings 588 is to alleviate the clogging caused by light particulate materials such as corn.

As with the system 420 described above, rotation of the barrel member 550 causes the raw slurry material to be displaced upward along the main processing chamber 534. However, the end plates prevent the raw slurry material carried upward by the pre-processing member 552 from entering the processing chambers. The raw slurry material carried by the pre-processing material thus bypasses the secondary processing chambers on the way up through the main processing chamber 534.

However, as the raw slurry material passes around the secondary processing chambers while traveling up through the main processing chamber 534, the raw slurry material mixes with rinse liquids introduced into the separator portion 574 of the main processing chamber 534 by the processing conduit 532. The raw slurry material and rinse liquids are mixed and allow separation of the heavier particulate materials from the liquid materials as generally described above with reference to the first example separator system 20.

Above the secondary processing chambers, the lighter particulate materials will float to the top of the mixture of raw slurry material and rinse liquids. The lighter particulate materials will thus flow down through the main processing chamber 534 over the inner edge 552a of the pre-processing member 552 with the liquid portion of the raw slurry material and the rinse liquids.

Thus, the liquid portion of the raw slurry material, rinse liquids, and these lighter particulate materials will flow over the inner edge of the pre-processing member 552 and into the secondary processing chambers 586a and 586b. However, the heavier particulate materials, such as sand, do not flow over the inner edge 552a into the secondary processing chamber. As the barrel member 550 rotates, the slurry liquids, rinse liquids, and lighter particulate materials eventually flow out of the proc-processing member 552 through the secondary processing openings 588. At least one and preferably two to three of the secondary processing openings 588 are formed in each of the secondary processing chambers.

The secondary troughs 542 and 544 are arranged below secondary processing openings 588 of the lower and upper secondary processing chambers 586a and 586b. Accordingly, any materials flowing out of the secondary processing openings 588 are collected by the troughs 542 and 544 for reuse, recycling, or disposal. Materials collected by the secondary processing chambers are thus prevented from reaching the main chamber 540. Much of the light particulate in the raw slurry material is collected by the secondary processing chambers and is thus prevented from collecting in and clogging the main chamber 540.

What is claimed:

1. A processing system for separating raw slurry material into particulate materials and liquid materials, the processing system comprising:
   a processing structure defining a processing chamber, an inlet, an outlet, and at least one pre-processing opening arranged between the inlet and the outlet;
   a frame for supporting the processing structure; and
   a drive motor; wherein
   operation of the drive motor rotates the processing structure such that
      at least some of the particulate materials in the raw slurry material are transported from the inlet to the outlet,
      at least some of the liquid materials in the raw slurry material are allowed to flow back towards the inlet, and
      at least some of the liquid materials and at least some of the particulate materials are allowed to flow through the at least one pre-processing opening.

2. A processing system as recited in claim 1, in which the processing structure comprises at least one separator member, where the at least one separator member defines at least one separator gap that allows liquids to flow towards the inlet while particulate materials are transported to the outlet.

3. A processing system as recited in claim 2, in which the processing structure comprises at least one pre-processing member, where the at least one pre-processing member is sized and dimensioned such that a substantial portion of heavy particulate materials of the slurry portion does not flow through the at least one pre-processing opening in the barrel member.

4. A processing system as recited in claim 1, in which the processing structure comprises a plurality of separator members, where the plurality of separator members defines a plurality of separator gaps that allow liquids to flow towards the inlet while particulate materials are transported to the outlet.

5. A processing system as recited in claim 1, in which the processing structure comprises at least one pre-processing member, where the at least one pre-processing member is sized and dimensioned such that a substantial portion of heavy particulate materials of the slurry portion does not flow through the at least one pre-processing opening in the barrel member.

6. A processing system as recited in claim 1, further comprising at least one pre-processing member and at least one secondary processing member, wherein the at least one pre-processing opening is arranged between the at least one pre-processing member and the at least one secondary processing member.

7. A processing system as recited in claim 6, in which the at least one pre-processing member and the at least one secondary processing member are sized, dimensioned, and arranged relative to each other such that some of the liquid materials and some of the particulate materials are allowed to flow through the at least one pre-processing opening.

8. A processing system as recited in claim 7, further comprising at least one end plate arranged to extend between the at least one pre-processing member and the at least one secondary processing member to define the secondary processing chamber, where the at least one pre-processing opening is arranged to allow fluid to flow out of the secondary processing chamber.

9. A processing system as recited in claim 8, in which the at least one pre-processing member is substantially helical, the at least one secondary processing member is substantially helical, and the secondary processing chamber is substantially helical and has an open side facing radially inwardly from the barrel member.

10. A processing system as recited in claim 1, further comprising at least one drain conduit arranged to collect material flowing through the at least one pre-processing opening.

11. A processing system as recited in claim 1, further comprising a plurality of the pre-processing openings.

12. A processing system as recited in claim 11, further comprising at least one drain conduit arranged below the plurality of pre-processing openings.

13. A method of separating raw slurry material into particulate materials and liquid materials comprising the steps of:
   defining a processing chamber having an inlet and an outlet;
   arranging at least one pre-processing opening between the inlet and the outlet; and
   rotating the processing chamber such that
      at least some of the particulate materials in the raw slurry material are transported from the inlet to the outlet,
      at least some of the liquid materials in the raw slurry material are allowed to flow back towards the inlet, and
      at least some of the liquid materials and at least some of the particulate materials are allowed to flow through the at least one pre-processing opening.

14. A method as recited in claim 13, in which the step of defining the processing chamber comprises the steps of:
   providing a processing structure comprising at least one separator member; and
   arranging the at least one separator member to define at least one separator gap that allows liquids to flow towards the inlet while particulate materials are transported to the outlet.

15. A method as recited in claim 14, in which the step of defining the processing chamber further comprises the steps of:
   providing at least one pre-processing member; and
   arranging the at least one pre-processing member such that a substantial portion of heavy particulate materials of the slurry portion does not flow through the at least one pre-processing opening in the barrel member.

16. A method as recited in claim 13, in which the step of defining the processing chamber comprises the steps of:
   providing a processing structure comprising a plurality of separator members; and
   arranging the plurality of separator members to define a plurality of separator gaps that allow liquids to flow towards the inlet while particulate materials are transported to the outlet.

17. A method as recited in claim 13, in which the step of defining the processing chamber comprises the steps of:
   providing a processing structure comprising at least one pre-processing member; and
   arranging the at least one pre-processing member such that a substantial portion of heavy particulate materials of the slurry portion does not flow through the at least one pre-processing opening in the barrel member.

18. A method as recited in claim 13, in which the step of defining the processing chamber comprises the steps of:

providing a processing structure comprising at least one pre-processing member and at least one secondary processing member; and arranging the at least one pre-processing opening between the at least one pre-processing member and the at least one secondary processing member.

19. A method as recited in claim 18, in which the step of defining the processing chamber further comprises the step of arranging the at least one pre-processing member and the at least one secondary processing member relative to each other such that some of the liquid materials and some of the particulate materials are allowed to flow through the at least one pre-processing opening.

20. A method as recited in claim 18, in which the step of defining the processing chamber further comprises the steps of:

arranging at least one end plate arranged to extend between the at least one pre-processing member and the at least one secondary processing member to define the secondary processing chamber; and arranging the at least one pre-processing opening to allow fluid to flow out of the secondary processing chamber.

21. A method as recited in claim 18, in which the at least one pre-processing member is substantially helical, the at least one secondary processing member is substantially helical, and the secondary processing chamber is substantially helical and has an open side facing radially inwardly from the barrel member.

22. A method as recited in claim 13, further comprising the step of arranging at least one drain conduit to collect material flowing through the at least one pre-processing opening.

* * * * *